United States Patent
Terayama et al.

(10) Patent No.: US 7,010,551 B2
(45) Date of Patent: Mar. 7, 2006

(54) FILE CONVERSION METHOD, FILE CONVERTER, AND FILE DISPLAY SYSTEM

(75) Inventors: Yasuhiro Terayama, Tokyo (JP); Koji Inai, Kanagawa (JP); Takashi Morita, Saitama (JP)

(73) Assignee: Sony Corporation, Tokyo (JP)

( * ) Notice: Subject to any disclaimer, the term of this patent is extended or adjusted under 35 U.S.C. 154(b) by 440 days.

(21) Appl. No.: 09/809,668

(22) Filed: Mar. 15, 2001

(65) Prior Publication Data

US 2002/0049777 A1 Apr. 25, 2002

(30) Foreign Application Priority Data

Mar. 17, 2000 (JP) .......................... P2000-081848
Feb. 9, 2001 (JP) .......................... P2001-034343

(51) Int. Cl.
*G06F 7/00* (2006.01)
*G06F 12/00* (2006.01)
(52) U.S. Cl. .................. 707/200; 707/1; 707/104.1
(58) Field of Classification Search .............. 707/1–10, 707/100, 104.1, 102, 200; 709/217, 218, 709/223, 224; 715/526, 501.1, 513
See application file for complete search history.

(56) References Cited

U.S. PATENT DOCUMENTS

| | | | | |
|---|---|---|---|---|
| 5,506,985 A | * | 4/1996 | Motoyama et al. | 715/523 |
| 5,548,508 A | * | 8/1996 | Nagami | 704/2 |
| 5,799,192 A | * | 8/1998 | Yasuda | 717/100 |
| 5,845,282 A | * | 12/1998 | Alley et al. | 707/10 |
| 5,848,263 A | * | 12/1998 | Oshikiri | 716/3 |
| 5,859,623 A | * | 1/1999 | Meyn et al. | 345/730 |
| 5,878,422 A | * | 3/1999 | Roth et al. | 707/100 |
| 5,911,776 A | * | 6/1999 | Guck | 709/217 |
| 6,052,735 A | * | 4/2000 | Ulrich et al. | 709/236 |
| 6,098,085 A | * | 8/2000 | Blonder et al. | 715/531 |
| 6,144,969 A | * | 11/2000 | Inokuchi et al. | 707/200 |
| 6,272,545 B1 | * | 8/2001 | Flanagin et al. | 709/228 |
| 6,377,952 B1 | * | 4/2002 | Inohara et al. | 707/101 |
| 6,385,606 B1 | * | 5/2002 | Inohara et al. | 707/4 |
| 6,405,356 B1 | * | 6/2002 | Yang | 716/10 |
| 6,415,307 B1 | * | 7/2002 | Jones et al. | 715/525 |
| 6,567,828 B1 | * | 5/2003 | Inohara et al. | 707/204 |
| 6,573,916 B1 | * | 6/2003 | Grossweiler et al. | 345/850 |
| 6,584,466 B1 | * | 6/2003 | Serbinis et al. | 707/10 |
| 6,691,281 B1 | * | 2/2004 | Sorge et al. | 715/503 |
| 6,750,830 B1 | * | 6/2004 | Teshima et al. | 345/1.2 |
| 6,765,596 B1 | * | 7/2004 | Lection et al. | 345/835 |

* cited by examiner

*Primary Examiner*—Greta Robinson
*Assistant Examiner*—Miranda Le
(74) *Attorney, Agent, or Firm*—Jay H. Maioli

(57) ABSTRACT

A file conversion method, a data converter, and a file display system for extracting data handled by a limited capability display device from a plurality of pieces of data displayable on a standard display unit with a start and an end of each piece of data indicated by respective identifiers and for outputting the extracted data to the device in which the identifier is detected by reading the file and it is then determined whether identified data can be displayed on the limited capability display device. The data identified by the identifier is extracted and an output file, different than the file that was read, is created from the extracted data.

24 Claims, 24 Drawing Sheets

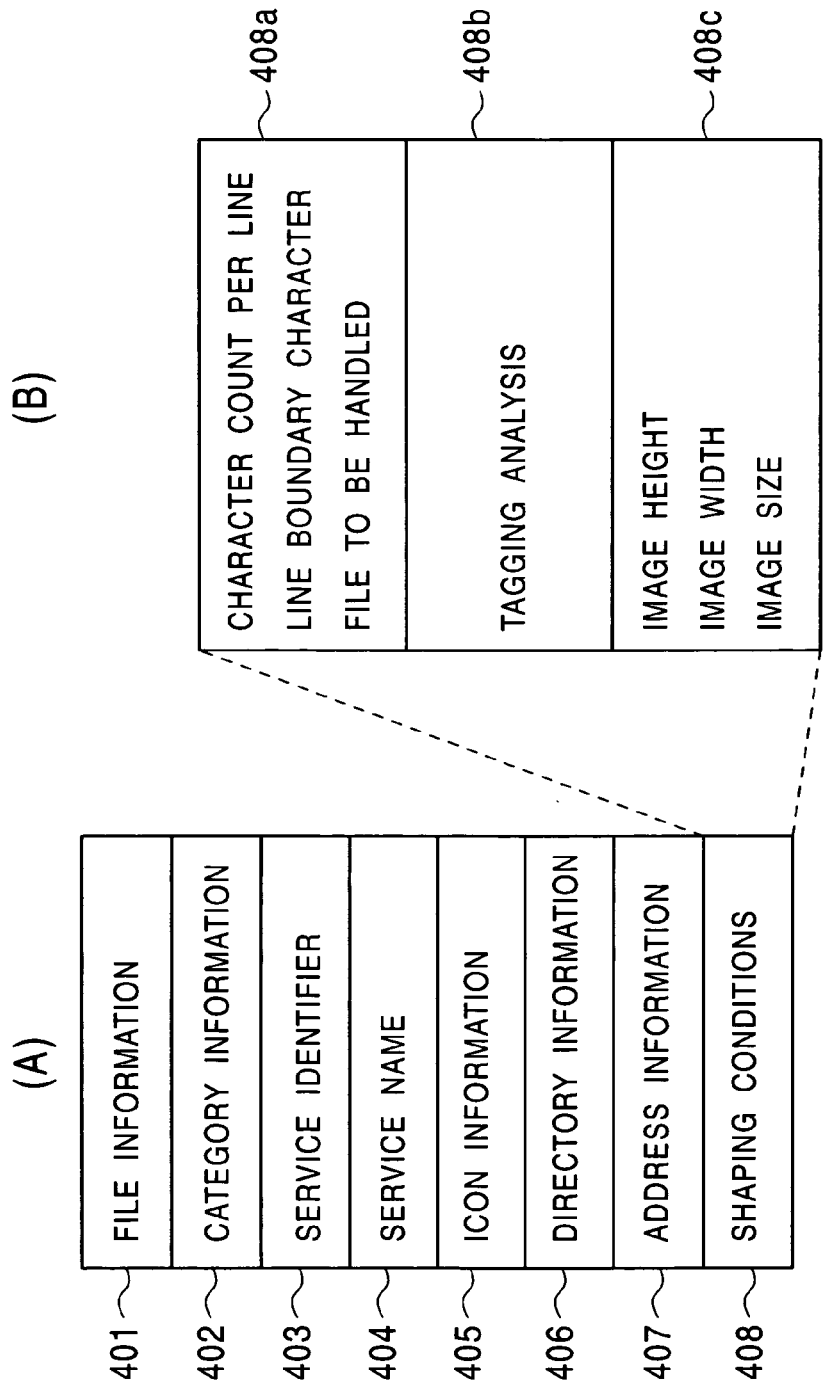

FIG. 8A

| ADDRESS | ○ ○ ○ ○ ○ ○ ○ |
|---------|----------------|
| TEL | △△-△△△△-△△△△ |
| FAX | ▫▫-▫▫▫▫-▫▫▫▫ |

FIG. 8B

```
<TABLE BORDER>
<TR>ADDRESS<TD>   oo-oooo-oooo   </TR>
<TR>TEL<TD>       △△-△△△△-△△△△   </TR>
<TR>FAX<TD>       ▫▫-▫▫▫▫-▫▫▫▫   </TR>
</TABLE>
```

FIG. 8C

ADDRESS
oo-oooo-oooo
TEL
△△-△△△△-△△△△
FAX
▫▫-▫▫▫▫-▫▫▫▫

FIG. 10

```
<GETINFO name=" Samplefile" link=" Reffig.bmp>
THIS FILE IS SAMPLE DATA.
FIGURE 1 IS PROVIDED AS A REFERENCE TO THIS FILE.
<IMG SRC=fig. bmp ALT="Reference figure"
</GETINFO>
```

FIG. 11A

```
<GETINFO name=" Samplefile">
EFFECTIVE DATA STARTS FROM HERE.
    <DUMPINFO>
    THIS RANGE IS NOT ACQUIRED.
    </DUMPINFO>
THIS FILE IS A SAMPLE.
EFFECTIVE DATA ENDS HERE.
</GETINFO>
```

FIG. 11B

CONTENT OF Samplefile. txt
EFFECTIVE DATA STARTS FROM HERE.
THIS FILE IS A SAMPLE.
EFFECTIVE DATA ENDS HERE.

FIG. 12A

```
<GETINFO name = "exptag">
——— Tools Plus ———
FUNCTION SUMMARY & DESCRIPTION
<IC_INDEX name = "contents">
TABLE OF CONTENT/FUNCTION
SUMMARY/TAG DESCRIPTION
</IC_INDEX>
THIS FILE DESCRIBES TAGS.
SEE "APPENDIX" FOR DETAILS.
</GETINFO >
```

FIG. 12B

```
——— Tools Plus ———
FUNCTION SUMMARY & DESCRIPTION
THIS FILE DESCRIBES TAGS.
SEE "APPENDIX" FOR DETAILS.
```

FIG. 12C

```
TABLE OF CONTENT/FUNCTION SUMMARY/
TAG DESCRIPTION
```

FIG. 13

```
<COUPON limit="3month">
<P>
<TABLE BORDER CELLSPACING=2 CELLPADDING=10>
<TR>
<TD ALIGN=CBNTER NOWRAP>
<FONT SIZE=+2><B>COUPON</B></FONT>
<P>

FOLLOWING PRIVILEGES ARE GRANTED.
(SINGLE COUPON IS EFFECTIVE FOR AN INDIVIDUAL OR A GROUP.)
<P>
<FONT>
<B> 500 YEN DISCOUNT PER PERSON </B>
</FONT>
<P>
* A SINGLE COUPON EFFECTIVE ONE TIME ONLY
<BR>
CHAIN PUB HOUSE AT GOTANDA
</TD>
</TR>
</TABLE>
</COUPON>
```

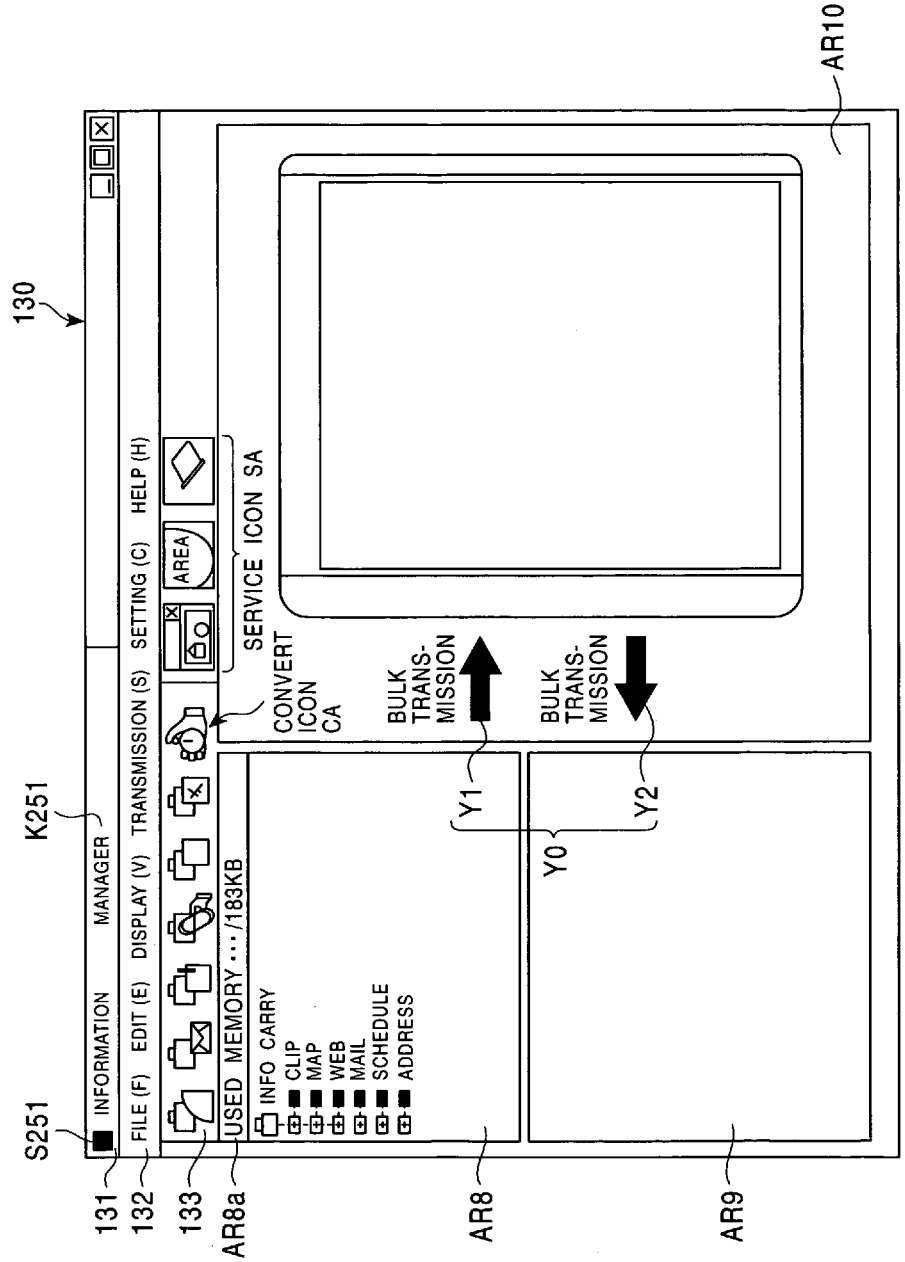

FILE CONVERSION METHOD, FILE CONVERTER, AND FILE DISPLAY SYSTEM

BACKGROUND OF THE INVENTION

1. Field of the Invention

The present invention relates to a file conversion method, a data converter, and a file display system for extracting data, which can be handled by a device having a limited display capability, from a file composed of a plurality of pieces of data displayable on a display unit with a start and an end of each piece of data indicated by respective identifiers and for outputting the extracted data to the limited-capability device.

2. Description of the Related Art

The network called the Internet is now in widespread use, and users have an easy access to a diversity of information through personal computers over the Internet. Information the user monitors using a software program called Web browser is described in the HTML (HyperText Markup Language).

The HTML document is associated with an identifier called tag. The tag determines the structure of each document. Specifically, when the user monitors a HTML document using the Web browser, the font, the size, and the color of a text, and the location of an image file are described by the tag. The tag determines the structure of the text information and image information on a Web page monitored by the user.

The use of mobile terminals becomes widespread, and the user has an immediate access to various pieces of information in transit or at a destination of a travel. To gain access to desired information on a mobile terminal, the user needs to input information on the mobile terminal. As a means for collecting information to the mobile terminal, the user may use a personal computer. The user connects the mobile terminal to the personal computer to download the desired information to the mobile terminal.

When a user transmits, to a mobile terminal, Web page information which has been obtained to a personal computer from a particular server, it is necessary to reorganize the information into data displayable on the mobile terminal and then transmit the data to the mobile terminal. The user must select required data from unnecessary data, and transmit the required data only. Further, the user must reorganize the extracted data in a size and format displayable or easy to see on the mobile terminal. The user is therefore forced to perform a variety of jobs from acquiring home page data to transmitting the reorganized data to the mobile terminal.

Although the Web pages provided over the Internet are written in the HTML, their formats are diversified. Specifically, the contents provided by the servers are varied in HTML document structure from server to server. The user is forced to use different extraction methods and different shaping methods from content to content to reorganize the data for the mobile terminal.

When the user uses a browser, a home page service on the network may be preregistered as a bookmark on the computer. Since the bookmark is stored in the URL (Uniform Resource Locator) or character strings, the user has difficulty identifying the content provided by the service at a glance.

SUMMARY OF THE INVENTION

It is an object of the present invention to provide a file conversion method, a data converter, and a file display system for extracting data handled by a device having a limited display capability from a plurality of pieces of data displayable on a display unit with a start and an end of each piece of data indicated by respective identifiers and for outputting the extracted data to the limited-capability device.

The present invention in one aspect relates to a file conversion method for extracting, from a file composed of a plurality of pieces of data displayable on a display unit and with a start and an end of each piece of data indicated by respective identifiers, data displayable on a limited-capability device, in accordance with the identifiers, and for outputting the extracted data to the limited-capability device. The file conversion method includes a step of detecting the identifier by reading the file, a step of determining whether the limited-capability device can display the data indicated by the extracted identifier, a step of extracting the data, the start and the end of which are indicated by the determined identifier and which is determined to be displayable on the limited-capability device, and a step of outputting an output file which is newly created from the extracted data, as a different file from the first file.

The present invention in another aspect relates to a file converter for extracting, from a file composed of a plurality of pieces of data displayable on a display unit and with a start and an end of each piece of data indicated by respective identifiers, data displayable on a connected limited-capability device, and for outputting the extracted data to the limited-capability device. The file converter includes a file storage unit for storing the file, a detector unit for detecting the identifier which indicates the data displayable on a limited-capability device from the file stored in the file storage unit, a extractor unit for extracting, from the file, the data with the start and the end thereof indicated, in accordance with the identifier detected by the detector unit, an output unit for outputting the extracted data to the limited-capability device, and a control unit for controlling the detector unit to detect the identifier indicating the start and the end of the displayable data for the purpose of extracting the data displayable on the limited-capability device from the file stored in the file storage unit, for controlling the extractor unit to extract, as a new output file, data including the start and the end indicated by the identifier from the file, and for controlling the output unit to output the new output file to the limited-capability device.

The present invention in yet another aspect relates to a file conversion method for converting a file composed of a plurality of pieces of data displayable on a display unit with a start and an end of each piece of indicated by respective identifiers into data displayable on a connected limited-capability device, and outputting the data as a new output file to the limited-capability device. The file conversion method includes a step of initializing a first data buffer for buffering data when a plurality of pieces of data is read from the file, a step of detecting the identifier indicating the start of the data in the file, based on a rule for processing the data in the file into a data format displayable on the limited-capability device, when the data is from the file and is stored in the first data buffer, a step of moving the data stored in the first data buffer to a second data buffer for evacuation, a step of holding the data in the file, from the start thereof, into the first data buffer, based on the identifier indicating the start of the detected data, a step of detecting the identifier indicating the end of the data having the identifier indicating the end of the detected data, and a step of moving the data evacuated into the second data buffer to the first data buffer for restoration.

The present invention in still another aspect relates to a file display system including a first apparatus for receiving a file including a plurality of pieces of data, displayable on a display unit, with the start and the end of each piece of data indicated by respective identifiers, and a second apparatus having a throughput lower than that of the first apparatus and receiving and displaying data into which the first apparatus converts the file. The first apparatus includes a storage unit for storing the file input thereto, a detector unit for detecting an identifier which indicates the data, which is processable by the second apparatus, from the file stored in the storage unit, an extractor unit for extracting, from the input file, the data which is detected by the detector unit and is processed into data processable by the second apparatus, a processing unit for processing the extracted data into the data that is processable by the second apparatus, an output unit for outputting the data, which has been processed to be processable by the second apparatus, to the second apparatus, and a control unit for controlling the storage unit to store the file input thereto in the storage unit, for controlling the detector unit to detect the identifier that indicates, from the file stored in the storage unit, data that can be processed to be processable by the second apparatus, for controlling the extractor unit to extract the data that is processed by the processing unit in accordance with the identifier detected by the detector unit, and for controlling the output unit to output the data that has been processed by the processing unit. The second apparatus includes a receiver unit for receiving the data output by the first apparatus, and a display unit for displaying the data received by the receiver unit.

BRIEF DESCRIPTION OF THE DRAWINGS

FIG. 7 shows the data structure of processing condition data in the information processing apparatus of the present invention;

FIG. 8A shows an initial state of in a shaping process in the information processing apparatus of the present invention;

FIG. 8B shows source data out of page data representing the shaping process in the information processing apparatus;

FIG. 8C shows a state subsequent to the shaping process in the information processing apparatus of the present invention;

FIG. 10 shows one example of page data associated with a designated identifier in the information processing apparatus of the present invention;

FIG. 11A shows another example of page data associated with a designated identifier in the information processing apparatus of the present invention;

FIG. 11B shows the result of shaping process performed on the page data associated with a designated identifier in the information processing apparatus of the present invention;

FIG. 12A shows another example of page data associated with a designated identifier in the information processing apparatus of the present invention;

FIG. 12B shows first text data that has been shaped from the example of page data associated with the designated identifier in the information processing apparatus of the present invention;

FIG. 12C shows second text data that has been shaped from the example of page data associated with the designated identifier in the information processing apparatus of the present invention;

FIG. 13 shows one example of page data associated with a designated identifier in the information processing apparatus of the present invention;

FIG. 14 shows a screen window in a preferred embodiment of the information processing apparatus of the present invention;

DESCRIPTION OF THE PREFERRED EMBODIMENTS

Figure 1:
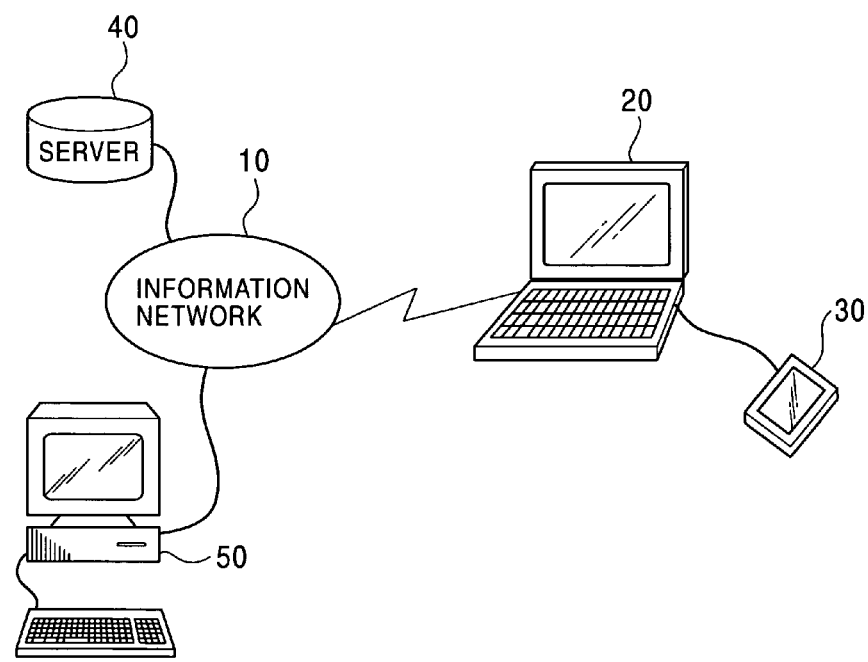
FIG. 1 is a network diagram showing a preferred embodiment of an information processing apparatus of the present invention.

The embodiments of the present invention are now discussed, referring to the drawings. The following embodiments are illustrative only, and unless otherwise particularly described, the scope of the invention is not limited to these embodiments.

FIG. 1 is a network diagram showing a preferred embodiment of an information processing apparatus 20 of the present invention. The information processing apparatus 20 is now discussed, referring to FIG. 1. An information network 10 is connected to a plurality of servers 40, a client 50, and the information processing apparatus 20 to exchange data in a communication protocol such as the TCP/IP (Transmission Control Protocol/Internet Protocol). The server 40 stores a diversity of information to be provided to the client 50 and the information processing apparatus 20. The client 50 and the information processing apparatus 20 gain access to the server 40 to acquire information (data). The information network 10 is a wide-area network such the Internet or a LAN (Local Area Network). The information network 10 is constructed to provide the client with HTML documents of the WWW (World Wide Web).

Figure 6:
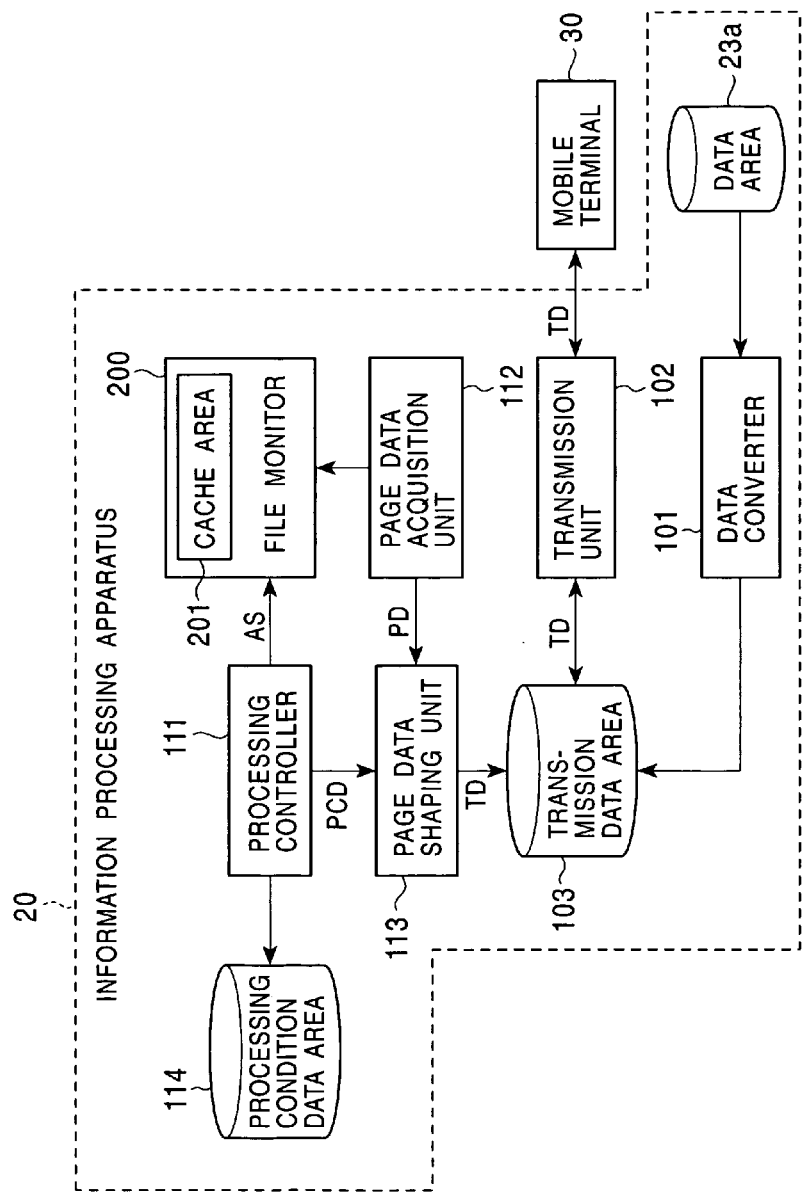
FIG. 6 is a block diagram showing a preferred embodiment of the information processing apparatus of the present invention.

The information processing apparatus 20 is a client computer on the network, and is provided with a file monitor 200 called Web browser as shown in FIG. 6 as will be discussed later. Using the file monitor 200, the client accesses a WWW server to acquire and monitor the data thereof. The information processing apparatus 20 has an external terminal to be connected to a mobile terminal 30, and can exchange data with the mobile terminal 30. The information processing apparatus 20 thus sends data stored therewithin to the mobile terminal 30, and further acquires the data stored in the mobile terminal 30.

Figure 2:
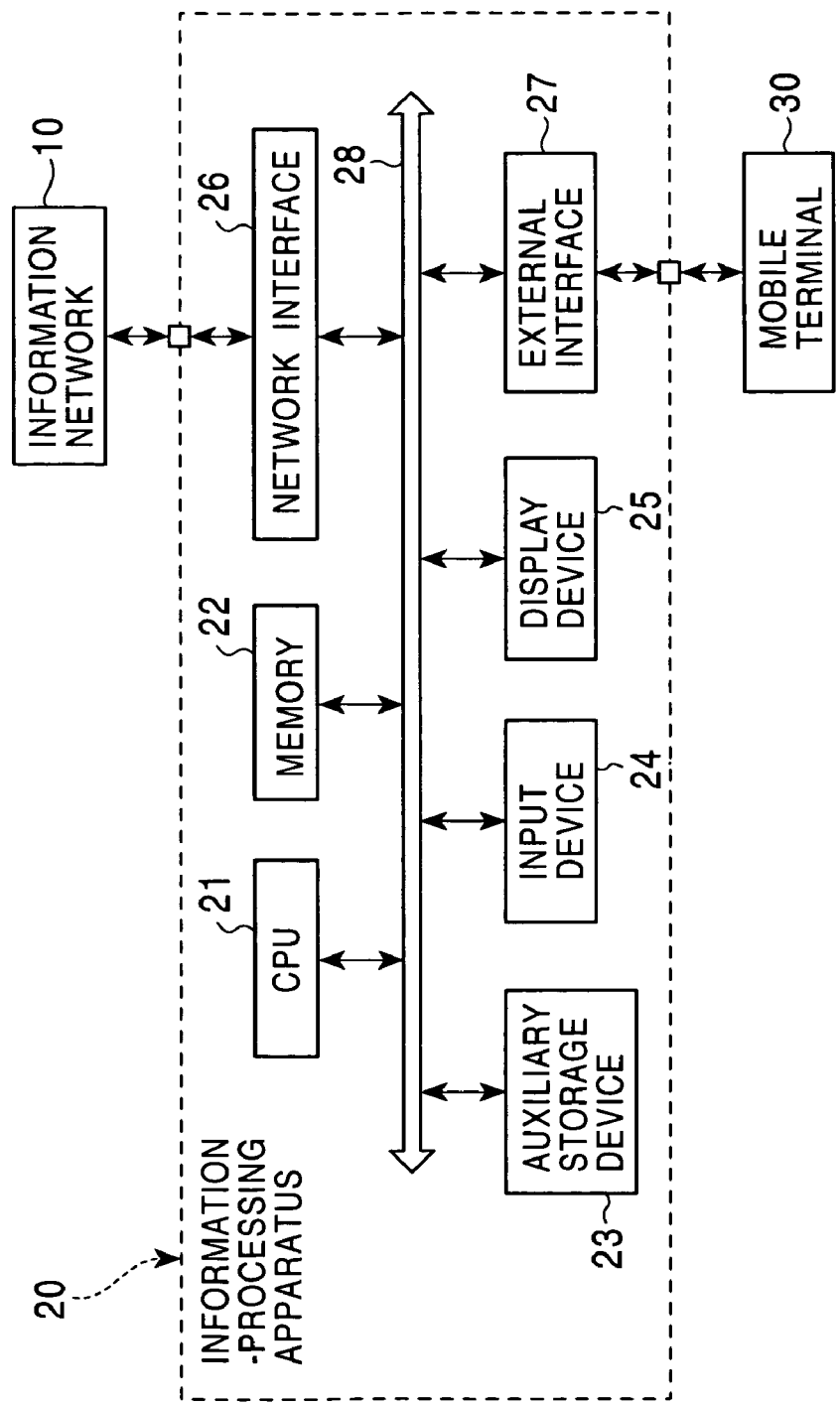
FIG. 2 is a block diagram showing the hardware structure of a preferred embodiment of the information processing apparatus of the present invention.

FIG. 2 shows the hardware structure of a preferred embodiment of the information processing apparatus 20 of the present invention. The information processing apparatus 20 is now discussed, referring to FIG. 2. As shown, the information processing apparatus 20 is constructed of hardware resources of a personal computer, and includes a CPU (Central Processing Unit) 21, a memory 22, an auxiliary storage device 23, an input device 24, a display device 25, a network interface 26, and an external interface 27.

The CPU 21 reads software programs stored in the auxiliary storage device 23 or the memory 22 via a bus 28, and generally controls the operation of the information processing apparatus 20. The CPU 21 executes a variety of software programs stored in the auxiliary storage device 23 to be discussed later. The memory 22 forms a work area for the CPU 21, and temporarily stores software programs and data.

The auxiliary storage device 23 is a storage medium in a hard disk drive, a floppy disk drive, or an optical disk drive, and stores an OS (Operating System), application software programs, and a variety of data including page data PD, transmission data TD, and processing condition data PCD. The input device 24 is a keyboard or a mouse, for example. The user operates the input device 24, controlling the information processing apparatus 20 to execute a variety of software programs.

The display device 25 is a liquid-crystal display or a CRT (Cathode-Ray Tube) display, and has a display screen. A screen window is presented on the display screen when software programs to be discussed later are executed. The network interface 26 has a function of exchanging data between the information network 10 and the information processing apparatus 20. The network interface 26 may include a modem to be connected to the information network 10 through a telephone line or an Ethernet adaptor to be connected to the information network 10 through a proxy server.

The external interface 27 exchanges data with an external device, and may be an USB interface, an IEEE1394 interface, an infrared communication interface, or a Bluetooth interface, for example. The external interface 27 has an external connection terminal, to which the mobile terminal 30 is connected in a wired or wireless fashion. The transmission data TD may be exchanged between the information processing apparatus 20 and the mobile terminal 30. The bus 28 is a signal line that permits information to be conveyed between devices constituting the information processing apparatus 20. Through the bus 28, data is internally exchanged in the information processing apparatus 20.

Figure 3A:
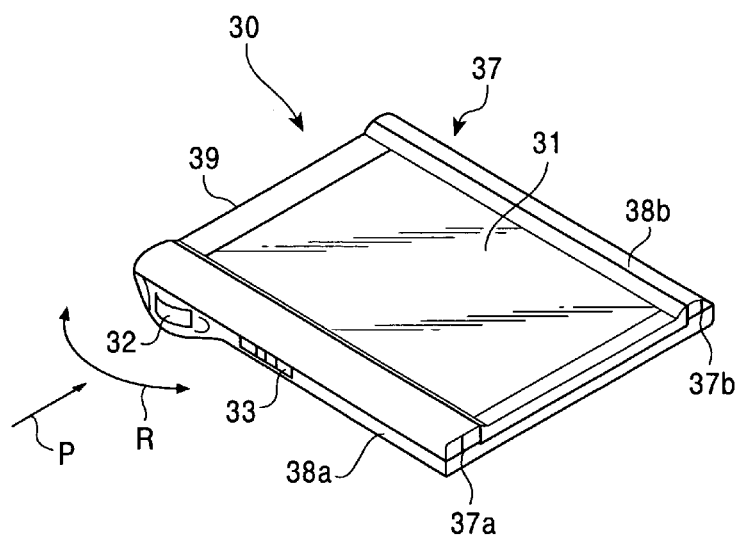
FIG. 3A is a perspective view of a mobile terminal which receives data from the information processing apparatus of the present invention.
Figure 3B:
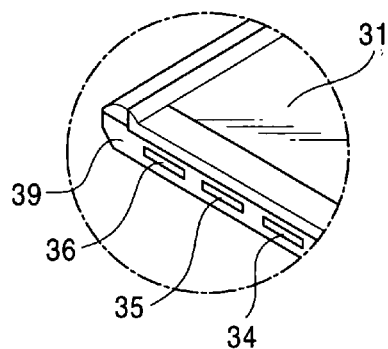
FIG. 3B is a partial perspective view of the mobile terminal on a larger scale which receives data transmitted from the information processing apparatus of the present invention.

FIG. 3A is a perspective view of the mobile terminal 30. Referring to FIGS. 3A and 3B, the mobile terminal 30 is now discussed. As shown, the mobile terminal 30 has a flat configuration, and has, on the front thereof, a display unit 31 formed of a liquid-crystal display panel. The display unit 31 has elongated projections 37a and 37b along the longitudinal edges thereof so that the display unit 31 is protected from a damage in the event of a fall, for example. Referring to FIG. 3A, a knob 32 and a power switch 33 are arranged on a left side panel 38a of a body 37. With the knob 32 and the power switch 33 mounted on the left side panel 38a, the left hand is used to operate the knob 32 and the power switch 33 with the mobile terminal 30 held in the left hand with the display unit 31 facing toward the user.

The knob 32 controls the operation of the mobile terminal 30. Operating the knob 32, the user displays predetermined information on the display unit 31. Specifically, the knob 32 is rotatable in the direction represented by an arrow R, and is pressed in the direction represented by an arrow P. The user rotates the knob 32 in the direction R to select transmission data TD to be displayed, and presses the knob 32 in the direction of the arrow P to cause the display unit 31 to display the transmission data TD. The power switch 33, a slide switch, controls the power for ON/OFF operation.

An external terminal 93, not shown in FIGS. 3A and 3B, is arranged on a right side panel 38b, diametrically opposite to the side of the knob 32. The external terminal 93 constitutes an interface for exchanging data with the information processing apparatus 20 shown in FIG. 1. The external terminal 93 performs communication via a wired link, a wireless link, or a infrared link, for example, and is formed of a USB terminal, an IEEE1394 terminal, or a radio communication interface antenna of Bluetooth. Referring to FIG. 3B, controls 34, 35 and 36 are arranged on the top end face 39 of the body 37. The controls 34, 35, and 36 control the back light for the display unit 31 for an ON/OFF operation, and control the operation mode of the mobile terminal 30.

Figure 4:
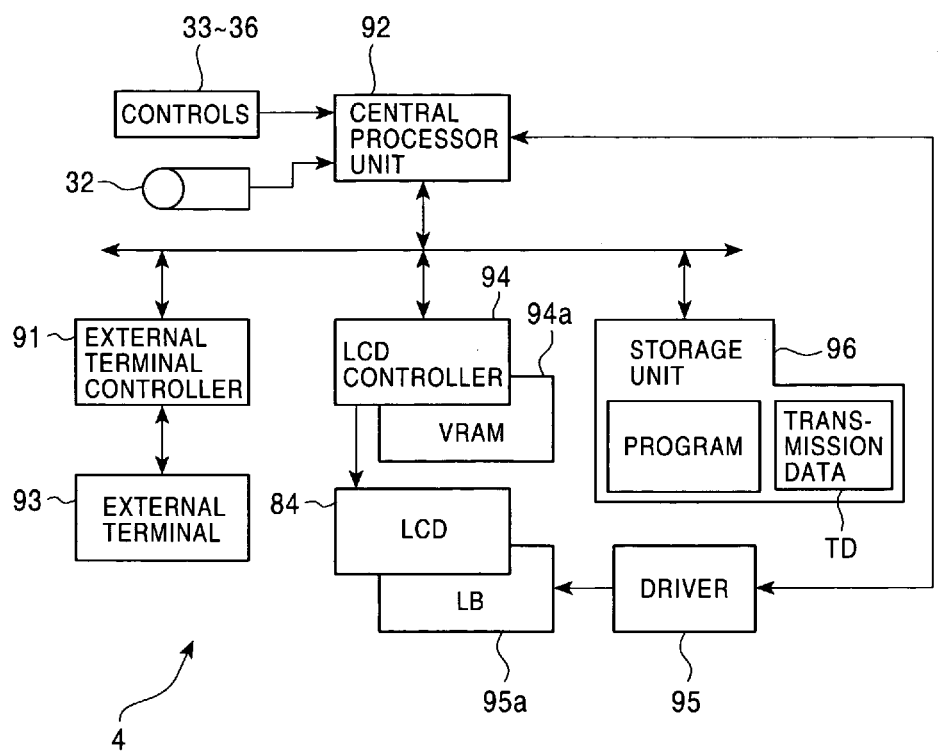
FIG. 4 is a block diagram showing the mobile terminal which receives data transmitted from the information processing terminal of the present invention.

FIG. 4 is a block diagram showing the construction of the mobile terminal 30. The mobile terminal 30 is discussed, referring to FIG. 4. As shown, an external terminal controller 91 exchanges data with an external device connected to the external terminal 93 under the control of a CPU (Central Processing unit) 92. A display controller 94 contains a VRAM (Video Random Access Memory) 94a, and displays a desired image by driving the display unit 31 in accordance with the content in the VRAM 94a. Under the control of the CPU 92, a driver circuit 95 drives a back light 95a. The back light 95a illuminates the display unit 31. The user operates the control 36, thereby controlling the operation of the driver circuit 95.

A storage unit 96 is fabricated of a flash memory, and stores a variety of software programs required by the CPU 92 for the operation thereof while storing the transmission data TD sent from the information processing apparatus 20. The transmission data TD in the storage unit 96 has a directory structure, and each directory stores files with the content thereof falling within the category of the directory.

The programs stored in the storage unit 96 include a transmission data processing program that processes the transmission data TD sent from the information processing apparatus 20 and displays the processed transmission data TD on the display unit 31. The transmission data processing program processes a predetermined data format only. By restricting processable data formats, hardware resources are simplified and the mobile terminal 30 is thus miniaturized with a flat design implemented.

The predetermined data formats may be text data for text information and bitmap data for image information. The transmission data TD is organized in files of text data or bitmap data. The text data refers to a file containing character data and limited control codes such as the one for line feed. The bitmap data refers to image data that is expressed by a set of points.

Figure 5B:
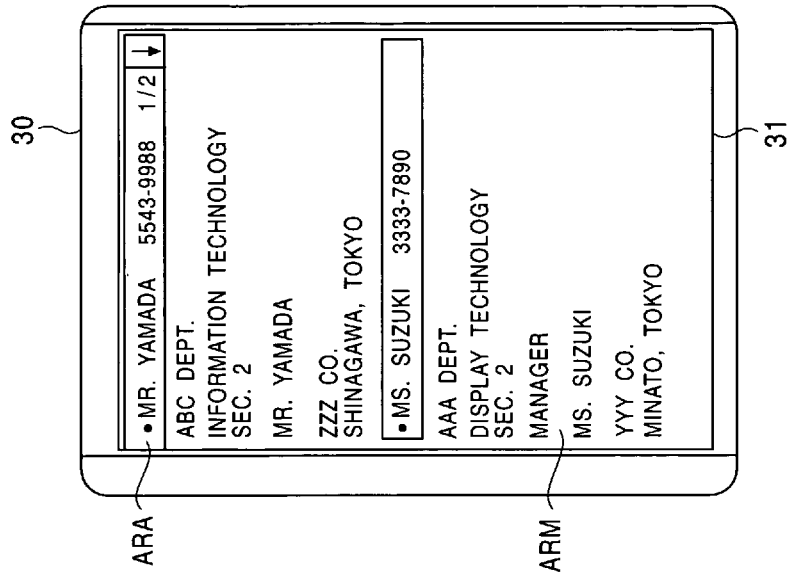
FIG. 5B shows a second display state of the display screen of the mobile terminal which receives data from the information processing apparatus of the present invention.
Figure 5A:
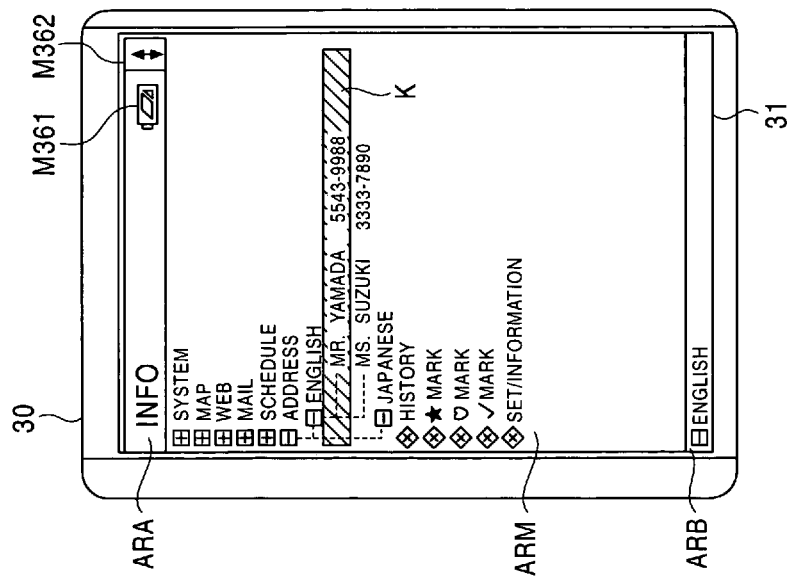
FIG. 5A shows a first display state of a display screen of the mobile terminal which receives data from the information processing apparatus of the present invention.

FIGS. 5A and 5B are plan views showing examples of the display screen of the mobile terminal 30. The screen of the display unit 31 displays the content of the storage unit 96 which is provided by the CPU 92 when the CPU 92 executes a processing program. FIG. 5A shows a main screen when the mobile terminal 30 is switched on. As shown, the top portion of the display unit 31, serving as an index display area ARA, displays the name of this mobile terminal 30 and a file name of text data or bitmap data. A battery mark M361 is presented on the right hand side portion of the index display area ARA. The battery mark M361 indicates a remaining battery power with the black area thereof varying depending on a battery status. The user thus monitors the remaining battery power.

An operation mark M362 is presented on the right of the battery mark M361. The operation mark M362 indicates the direction in which the knob 32 is rotatable. The user recognizes the operational state of the knob 32 at a glance. This provides a good user interface in operation.

A data display area ARM is presented below the index display area ARA. The data display area ARM displays the transmission data TD stored in the storage unit 96 of the mobile terminal 30 in a tree structure. The data display area ARM also displays the text data and the bitmap data in the storage unit 96, as shown in FIG. 5B. Viewing the data display area ARM, the user monitors the content of the transmission data TD.

The data display area ARM in FIG. 5A presents a variety of setting items for the mobile terminal 30, which is treated as a virtual folder, in a tree structure. For example, the setting items include system for this mobile terminal 30 user's personal information, History holding a record of displayed file names, Star mark being a virtual folder containing files marked by the user, Heart mark, Checkmark, and Set/information in which various settings are performed.

A select item display area ARB is provided on the bottom portion of the display unit 31. The select item display area ARB displays an item selected by a cursor K in the data display area ARM. Referring to FIG. 5B, the select item display area ARB is not displayed when the data display area ARM presents the content of a file on the screen.

The operation of the mobile terminal 30 is now discussed, referring to FIG. 3A through FIG. 5B. As shown in FIG. 3A, the power switch 33 is operated to switch on the mobile terminal 30. The screen appears on the display unit 31 as shown in FIG. 5A. Manipulating the knob 32, the user moves the cursor K within the display unit 31 to select a directory that stores the transmission data TD to be displayed.

When the user presses the knob 32 in the direction of the arrow P, the information of the selected directory appears in a tree structure. The user moves the cursor K within the directory using the knob 32, places the cursor K on a file to be displayed, and presses the knob 32. Referring to FIG. 5B, the transmission data TD is displayed on the data display area ARM.

FIG. 6 is a block diagram showing a preferred embodiment of the information processing apparatus of the present invention. The information processing apparatus 20 is discussed, referring to FIG. 6. As shown, the information processing apparatus 20 is generally controlled by the CPU 21 which works in accordance with information processing programs stored in the hard disk. Available as media for storing programs to be installed in a computer for execution are not only removable package media such as a floppy disk, a CD-ROM, and a DVD, but also a semiconductor memory and a magnetic disk into which programs are temporarily or permanently stored. Means for storing programs in a program storing medium may be a wired communication system or a wireless communication system such as a local area network, the Internet, or a digital broadcasting satellite. A variety of communication interfaces such as a router and a modem may be used between the communication system and the information processing apparatus 20.

Referring to FIG. 6, the information processing apparatus 20 includes a data converter 101, a transmission unit 102, a processing controller 111, a page data acquisition unit 112, and a page data shaping unit 113. The data converter 101 converts data in a variety of formats stored in a data area 23a of the auxiliary storage device 23 into the transmission data TD in a format displayable on the mobile terminal 30. For example, the data of a HTML document resulting from an electronic mail, an address book, schedule, maps, and an automatic Web page download program is converted into text data or bitmap data by the data converter 101.

The transmission unit 102 has the function of transmitting the transmission data TD stored in a transmission data area 103 to the mobile terminal 30. The transmission unit 102 has also the function of receiving and the transmission data TD from the mobile terminal 30 through the external interface 27 shown in FIG. 2 and the external terminal 93 shown in FIG. 4 and storing the received transmission data TD in the transmission data area 103. The transmission data TD transmitted from the transmission unit 102 can be monitored on the mobile terminal 30, while the transmission data TD transmitted from the mobile terminal 30 can be monitored on the information processing apparatus 20.

The transmission data area 103, storing the transmission data TD, is formed in the auxiliary storage device 23. In the transmission data area 103, the transmission data TD is arranged in a tree structure with the text files or the bitmap files in a directory. The data converter 101 and the page data shaping unit 113 to be discussed later are used to create a directory in the transmission data area 103 and store the text data or the bitmap data in the created directory. The transmission data TD is stored in a manner such that each file is held in a respective directory which is created corresponding to the category of the file. Viewing the directory, the user immediately learns which category the transmission data TD belongs to. In this way, the user interface of the information processing apparatus 20 is enhanced.

The processing controller 111 has the function of calling the processing condition data PCD stored in a processing condition data area 114, and sending the processing condition data PCD to the page data shaping unit 113 to be discussed later. Specifically, when the user clicks a service icon SA, the processing controller 111 recognizes a clicked service identifier 403. The processing controller 111 acquires the processing condition data PCD from the processing condition data area 114 according to the service identifier 403. The processing controller 111 sends address information 407 in the processing condition data PCD to the file monitor 200 while sending the address information 407 to the page data shaping unit 113 at the same time. The processing condition data area 114 is formed in the hard disk drive in the auxiliary storage device 23 shown in FIG. 2.

As will be discussed later, the processing controller 111, connected to a processing condition data server 11, updates the processing condition data PCD or adds new processing condition data PCD in the processing condition data area 114. The processing controller 111 starts up the file monitor 200 and displays an acquired icon AA to be discussed later.

Referring to FIG. 7, the processing condition data PCD includes file information 401, category information 402, the service identifier 403, a service name 404, icon information 405, directory information 406, the address information 407, shaping conditions 408, etc. The file information 401 includes information about the date of creation of the processing condition data PCD, the date of update of the processing condition data PCD, a file version number, etc. The category information 402 indicates the service content provided by the processing condition data PCD. Based on the category information 402, the processing condition data PCD is stored in a predetermined location in the processing condition data area 114. Network servers on the information network 10 are respectively tagged with their own service identifiers 403. The service name 404 is derived from the service provided by that network server.

The icon information 405 is image information for use in the service icon SA and the acquired icon AA, as will be discussed later. The directory information 406 is local address information according to which the page data shaping unit 113 creates a directory in the transmission data area 103. The address information 407 is an address of a network server providing service, for example, a URL. The shaping conditions 408 are conditions under which the page data shaping unit 113 shapes the page data PD. Based on these pieces of information, the processing controller 111 and the page data shaping unit 113 shape the page data PD.

As shown in FIG. 7, the shaping conditions 408 include format conditions 408a, tag analysis conditions 408b, and imaging conditions 408c. The format conditions 408a include a character count per line condition defining a character count per line in shaped text data, and a line boundary character condition setting a character that is prohibited from being positioned at the start of a line or the end of the line. The format conditions 408a also include file conditions that set the type of image data of an image contained in the page data PD, for example, JPEG, GTE, etc.

The tag analysis conditions 408b are used to analyze the tag structure of the page data PD in the shaping of the page data PD. When a table shown in FIG. 8A is inserted into the page data PD, the source of the page data PD is something like the one shown in FIG. 8B. The tag analysis conditions 408b are so set that a new line begins at a <TR>...<TR> tag and that another new line begins at a <TD> tag. In the shaped text data shown in FIG. 8C, a line begins at each cell. In this way, page data PD that is displayed in a particular format under the control of tag is automatically laid out and shaped in text data.

The imaging conditions 408c include, in the shaped bitmap data, an image size condition for setting the maximum file size of bitmap data, an image width condition for setting the minimum image width, and an image height condition for setting the minimum image height. The imaging conditions 408c set the size of the bitmap data displayable on the display unit 31 of the mobile terminal 30.

Figure 9:
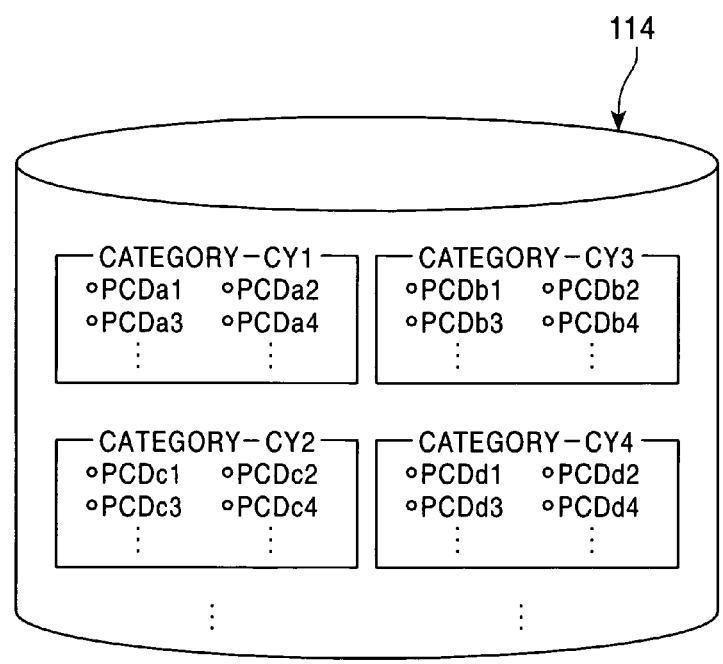
FIG. 9 shows the data structure of a processing condition data area in the information processing apparatus of the present invention.

Referring to FIG. 9, the processing condition data area 114 has a data structure containing a plurality of categories CY, each storing a plurality of pieces of processing condition data PCD. Specifically, the processing condition data server 11 creates categories CY1–CY4 having contents for restaurants, automobiles, computers, travels, for example. The category CY can be a directory, for example. The categories CY1–CY4 store the processing condition data PCD corresponding to the network servers assigned thereto. For example, if the category CY1 is for the computer field, the category CY1 corresponds to network servers of computer software firms and computer hardware firms, for example, and stores processing condition data PCDa1–PCDa4. The determination of the category CY is performed by the processing controller 111 according to the category information 402 in the processing condition data PCD.

The processing condition data PCD is stored according to the category CY. As will be discussed later, to select the processing condition data PCD to be used, the user selects the category first, and selects the processing condition data PCD. The user can register desired service with ease, and user interface is improved.

The page data acquisition unit 112 acquires the page data PD displayed on the file monitor 200, and sends the page data PD to the page data shaping unit 113. The file monitor 200, a so-called browser, is a computer application software for browsing the page data PD that can be accessed over a global network such as the Internet or a local network. The page data PD is compatible with a format such as HTML, SGML (Standard Generalized Markup Language), or XML (extensible Markup Language), and includes a control character called a tag. The file monitor 200 includes a cache area 201 for temporarily storing the browsed page data PD. The cache area 201 is formed in the hard disk in the auxiliary storage device 23.

The page data acquisition unit 112 searches for the page data PD currently displayed on the file monitor 200 referring to the page data PD stored in the cache area 201 of the file monitor 200. This searching operation is performed based on the address AS of the page data PD displayed on the file monitor 200. The address AS indicates the location of the page data PD over the network, and can be a URL (Uniform Resource Locator), for example. The page data acquisition unit 112 sends the page data PD in the cache area 201 to the page data shaping unit 113.

Specifically, the page data acquisition unit 112 acquires, from the cache area 201 of the auxiliary storage device 23, the page data PD already monitored with the information processing apparatus 20 connected to the network. Even in its unconnected state with the network, the page data PD currently viewed is monitored again. As will be discussed later, the user shapes the page data PD after viewing the page data PD, and determining whether to shape the page data PD.

The page data shaping unit 113 shapes the page data PD sent from the page data acquisition unit 112 based on the processing condition data PCD to display the page data PD on the mobile terminal 30. When the page data PD is a HTML document, for example, the page data PD may include text data, image data, banner advertisements, scripts, backgrounds, etc. The form of the text data and the size of the image data are different from page data to page data.

Analyzing the page data PD, the page data shaping unit 113 extracts data to be transmitted to the mobile terminal 30, such as text data and image data, in accordance with the processing condition data PCD. Specifically, the page data shaping unit 113 removes unnecessary data such as the banner advertisements. The page data shaping unit 113 organizes the text data portion of the extracted page data PD into a text file. In the extraction of the data, the page data shaping unit 113 recognizes a designated identifier STG attached to the page data PD, and determines the type of the data delimited by the designated identifiers STG.

The designated identifiers STG include a <GETINFO> tag and a </GETINFO> tag for delimiting a data shaping area, a <DUMPINFO> tag and a </DUMPINFO> tag for delimiting an unnecessary data area, a <IC_INDEX> tag and a </IC_INDEX> tag for indicating data index information, and a <COUPON> tag and a </COUPON> tag for indicating coupon information.

The <GETINFO> tag and the </GETINFO> tag are located at the ends of the transmission data TD to be acquired. For example, in the page data PD shown in FIG. 10, the page data shaping unit 113 analyzes the data between the <GETINFO> tag and the </GETINFO> tag, and recognizes the data as the data to be shaped. The <GETINFO> tag permits a "name" parameter and a "link" parameter to be designated. The "name" parameter designates a name when the range delimited by the <GETINFO> tag and the </GETINFO> tag is shaped. The "link" parameter designates a link to another file in the shaped file.

The <DUMPINFO> tag and the </DUMPINFO> tag designate an unnecessary data area in need of no shaping process in the page data PD. In the page data PD shown in FIG. 11A, for example, the page data shaping unit 113 recognizes the data delimited by the <DUMPINFO> tag and the </DUMPINFO> tag as a range in need of no shaping, and performs no tag analysis for HTML. If the <GETINFO> tag and the </GETINFO> tag are set up, there is no need for designating an unnecessary data range. However, when the unnecessary data range is extremely large, the use of the <DUMPINFO> tag and the </DUMPINFO> tag shortens the process involved. FIG. 11B shows an actual shaping result of the description shown in FIG. 11A. The file name actually shaped is "Samplefile.txt", and the data delimited by the <DUMPINFO> tag and the </DUMPINFO> tag, namely, the message "This range is not acquired" is not present after the shaping process as shown in FIG. 11B.

The <IC_INDEX> tag and the </IC_INDEX> tag indicate the type of data and individual information expressed in the page data PD. When the <IC_INDEX> tag and the </IC_INDEX> tag are included within the range delimited by the <GETINFO> tag and the </GETINFO> tag, the data between the <IC_INDEX> tag and the </IC_INDEX> tag is extracted to form a single file. In this case, a file formed by the <GETINFO> tag and the </GETINFO> tag excludes the data delimited between the <IC_INDEX> tag and the </IC_INDEX> tag. Like the <GETINFO> tag, the </IC_INDEX> tag permits a "name" parameter and a "link" parameter to be designated.

In the page data PD shown in FIG. 12A, the page data shaping unit 113 creates the file name "exptag.txt" by the <GETINFO> tag shown in FIG. 12B and the file name "contents.txt" by the <IC_INDEX> tag shown in FIG. 12C.

The <COUPON> tag and the </COUPON> tag indicate the coupon information in the page data PD. Coupon information for providing price discount or service in restaurants, tailor's, mass merchandise outlets, for example, has been conventionally distributed by a paper sheet ticket as a medium. When coupon information is distributed using a network such as the Internet, the coupon information is transmitted to the mobile terminal 30, and the coupon information may be verified at a restaurant, for example. The <COUPON> tag and the </COUPON> tag provide the coupon information in the page data PD.

In the page data PD shown in FIG. 13, the page data shaping unit 113 recognizes the range delimited by the <COUPON> tag and the </COUPON> tag as the coupon information. Like the <GETINFO> tag, the <COUPON> tag permits a "name" parameter and a "link" parameter to be designated. Further, the <COUPON> tag designates a "limit" parameter. The "limit" parameter indicates the expiration date of the content of the coupon information.

In accordance with the designated identifier STG, the page data shaping unit 113 analyzes the page data PD for the acquired area, the unnecessary area, the file name, and the coupon information, and then shapes the transmission data TD. Using the designated identifier STG, the page data shaping unit 113 efficiently and quickly shapes the page data PD. Based on the designated identifier STG, the page data shaping unit 113 imparts new additional information, such as an expiration date and a file name of the shaped data file to the shaped data. For example, when the file shaped by the user is the coupon information, the data may be organized so that the user easily recognizes when it comes the expiration date.

It is possible to dynamically impart information to the page data PD, for example, of how many days the information remains effective from when the user acquired the page data PD. The information provider has more freedom of information added to the page data PD. Now, described in the page data PD is a designated identifier for imparting additional information using information prestored and set in the information processing apparatus 20, namely, the user computer. The additional information is imparted according to the information prestored and set in the user computer. Information is thus dynamically imparted.

For example, map information is now stored. By simply designating latitude and longitude by the designated identifier STG or the parameters thereof, the geographic position on the map is determined. The page data PD may include a designated identifier STG for creating a map file detailing a geographical area in and around the designated latitude and longitude for the user. The page data PD may include a designated identifier STG for adding to the shaped data, the data of the user name, user information, the age and sex of the user already registered in the user computer. By using the designated identifier STG in this way, not only the information provided by the service but also the user's individual additional information are added to the shaped data.

The page data PD may provide particular information such as the coupon information. As for the coupon information, the tags of the page data PD may not be sufficient enough to convey the expiration date. By allowing the page data shaping unit 113 to analyze the designated identifier STG and the parameters thereof, the user may use the coupon information provided by the page data PD in substantially the same intervals as the coupon information provided by an actual paper sheet coupon ticket.

The page data shaping unit 113 converts image data of various formats for instance, JPEG (Joint Photographic Coding Experts Group) or GIF (Graphics Interchange Format) into black and white binary bitmap data. The data converter 101 may convert the image data into the black and white binary bitmap data using a pattern method, a cluster method, or a dithering method. The page data acquisition unit 112 aligns the text document while adjusting the size of the image data.

In this way, the page data shaping unit 113 has the function of shaping the page data PD, such as analyzing, extracting, converting, and aligning the page data PD. The data converter 101 creates a directory (a folder) in the transmission data area 103, and stores the converted transmission data TD in that directory.

FIG. 14 shows a main window 130 of the information processing apparatus 20 of the present invention. The user operates the information processing apparatus 20 observing the main window 130. The main window 130 is presented on the display device 25 at the startup of an information processing program. The main window 130 of the information processing apparatus 20 shown in FIG. 14 includes a title bar 131, a menu bar 132, a tool bar 133, a transmission data window AR 8, a preview window AR 9, a mobile terminal window AR 10, etc.

The title bar 131 displays a window name K251 and an icon S251. The menu bar 132 is used to execute commands for shaping and transmitting the page data PD, and settings for the information processing apparatus 20. The tool bar 133 presents icons of frequently used commands registered in the menu bar 132. By clicking an icon, the respective process is executed.

The tool bar 133 presents a conversion icon CA and a service icon SA. When the conversion icon CA is clicked, the data converter 101 shown in FIG. 6 starts up, performing a conversion operation. The service icon SA is formed for each server, and each service icon SA is assigned with a service identifier 403 shown in FIG. 7A. In response to the clicking of the service icon SA, the service identifier 403 is sent to the processing controller 111 shown in FIG. 6. The processing controller 111 starts up, thereby extracting the processing condition data PCD in accordance with the service identifier 403.

The transmission data window AR 8 displays the content of the transmission data area 103, namely, the transmission data TD in a tree structure. By selecting a predetermined file in the transmission data window AR 8 with a cursor, the selected file is transmitted and displayed on the preview screen. The transmission data window AR 8 includes, on the upper portion thereof, a memory window AR 8a for displaying the capacity of the storage unit 96 in the mobile terminal 30 and the size of the transmission data TD stored in the transmission data area 103. Monitoring the memory window AR 8a, the user transmits data to the mobile terminal 30. The user can thus adjust the number and file size of the transmission data TD transmitted to the mobile terminal 30.

The preview window AR 9, formed below the transmission data window AR 8, displays the transmission data TD selected in the transmission data window AR 8. When a text file is selected in the transmission data window AR 8, the preview window AR 9 displays a text document. When a bitmap file is selected, the preview window AR 9 displays a black and white binary image. The mobile terminal window AR 10 displays the front view of the mobile terminal 30 with the data shown in a tree structure on the screen of the mobile terminal 30.

The mobile terminal window AR 10 displays a transmission icon Y0. The transmission icon Y0 includes an arrow Y1 pointing from the transmission data window AR 8 to the mobile terminal window AR 10 and an arrow Y2 pointing from the mobile terminal window AR 10 to the transmission data window AR 8. When the transmission icon Y0 is clicked, the transmission unit 102 shown in FIG. 6 starts up, sending the transmission data TD to the mobile terminal 30. Specifically, when the arrow Y1 is clicked, the transmission data TD is sent from the transmission data area 103 to the mobile terminal 30. When the arrow Y2 is clicked, the transmission data TD is sent from the mobile terminal 30 to the transmission data area 103.

Figure 15:
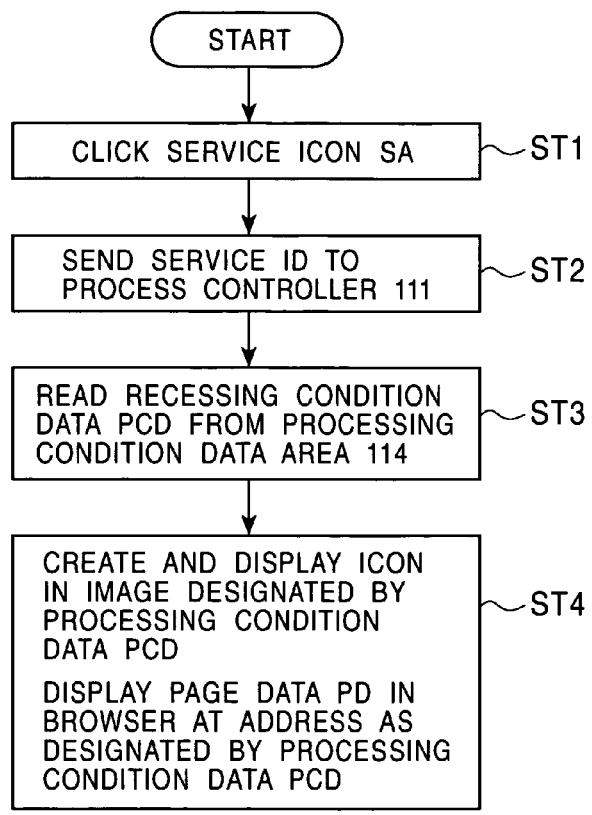
FIG. 15 is a flow diagram showing a preferred embodiment of the information processing method of the present invention.

FIG. 15 is a flow diagram showing a preferred embodiment of the information processing method of the present invention. The information processing method is now discussed, referring to FIG. 15. In step ST1, the user manipulates the mouse to click the service icon SA shown in FIG. 14. Instep ST2, the processing controller 111 shown in FIG. 6 receives the service identifier 403 assigned to each service icon SA.

In step ST3, the processing controller 111 reads the processing condition data PCD of the service identifier 403 received from the processing condition data area 114. In step ST4, the processing controller 111 displays the acquired icon AA on the display device 25 using the image of the service identifier 403 in the processing condition data PCD. The processing controller 111 starts up the file monitor 200, sending the address information 407 of the processing condition data PCD to the file monitor 200.

Figure 16:
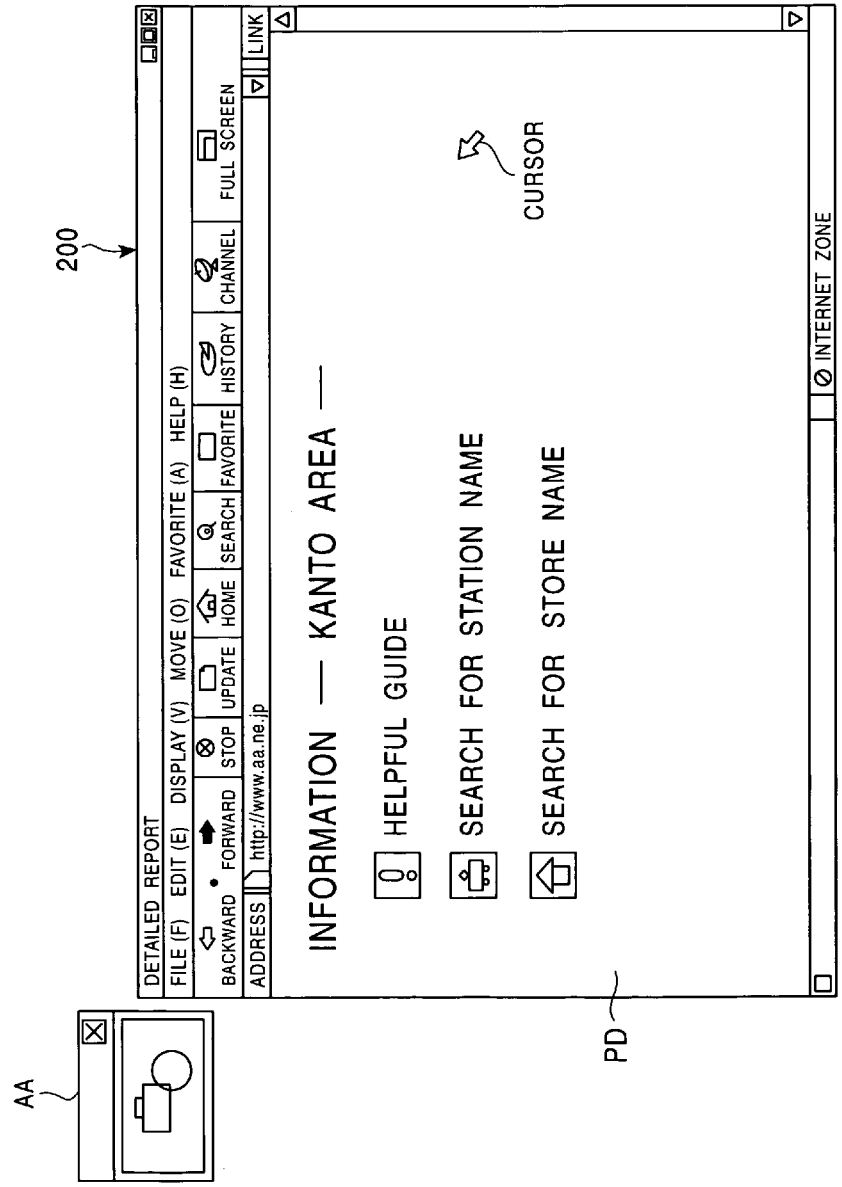
FIG. 16 shows a screen window in a preferred embodiment of the information processing apparatus of the present invention.

Referring to FIG. 16, the display device 25 displays, on the screen thereof, the file monitor 200 with the page data PD of the address information 407 of the processing condition data PCD presented thereon, and the acquired icon AA. The page data PD presented on the file monitor 200 can be an index page, i.e., the top page of the database accessible on the network server.

Figure 17:
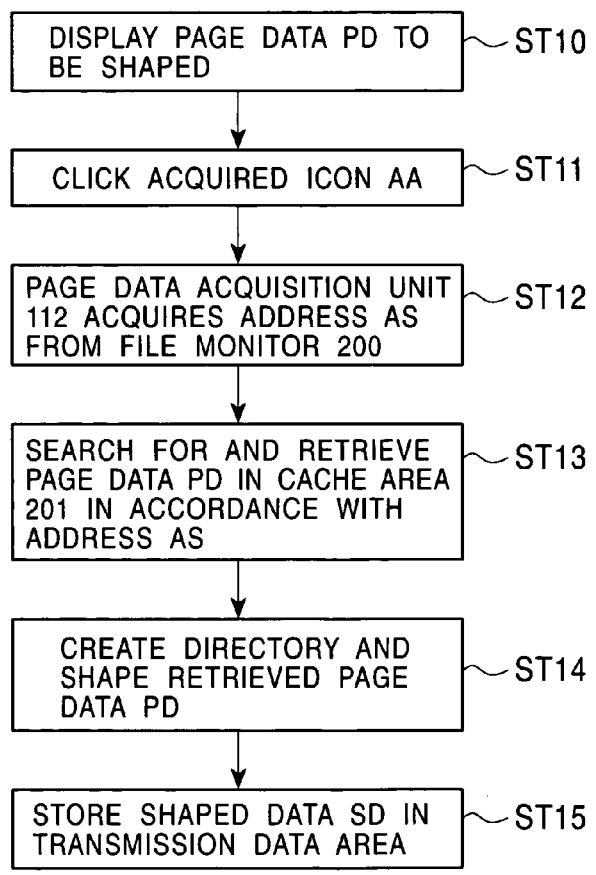
FIG. 17 is a flow diagram showing a preferred embodiment of the information processing method of the present invention.

Referring to FIG. 17, a procedure from the acquisition of the page data PD to the shaping of the page data PD is now discussed. In step ST10, monitoring the page data PD, the user operates the file monitor 200 so that the file monitor 200 presents the desired page data PD to be displayed, namely, the page data PD to be transmitted to the mobile terminal 30. In step ST11, the user clicks the acquired icon AA when the target page data PD is displayed on the file monitor 200. In response to the clicking of the acquired icon AA, the page data acquisition unit 112 starts up.

In step S12, the page data acquisition unit 112 shown in FIG. 6 acquires the address AS such as the URL from the file monitor 200. In step S13, the page data acquisition unit 112 searches for the data file of the page data PD currently being observed, based on the address AS. The page data acquisition unit 112 searches for the corresponding page data PD from among the page data PD stored in the cache area 201 in the file monitor 200. The page data acquisition unit 112 sends the acquired page data PD to the page data shaping unit 113.

In this way, the acquisition of the page data PD is performed in a off-line state without connecting to a network. This method eliminates a step for connecting to the network, and results in costs lower than those when a telephone line is used.

In step ST14, the page data shaping unit 113 creates a directory in the transmission data area 103, based on the directory information of the processing condition data PCD. Used as the name of the direction is the service name shown in FIG. 7A. A file corresponding to each service is stored in the directory created according to the type of service in the transmission data area 103. A file searching in the transmission data TD having a tree structure becomes easy, and user interface is improved.

Figure 18:
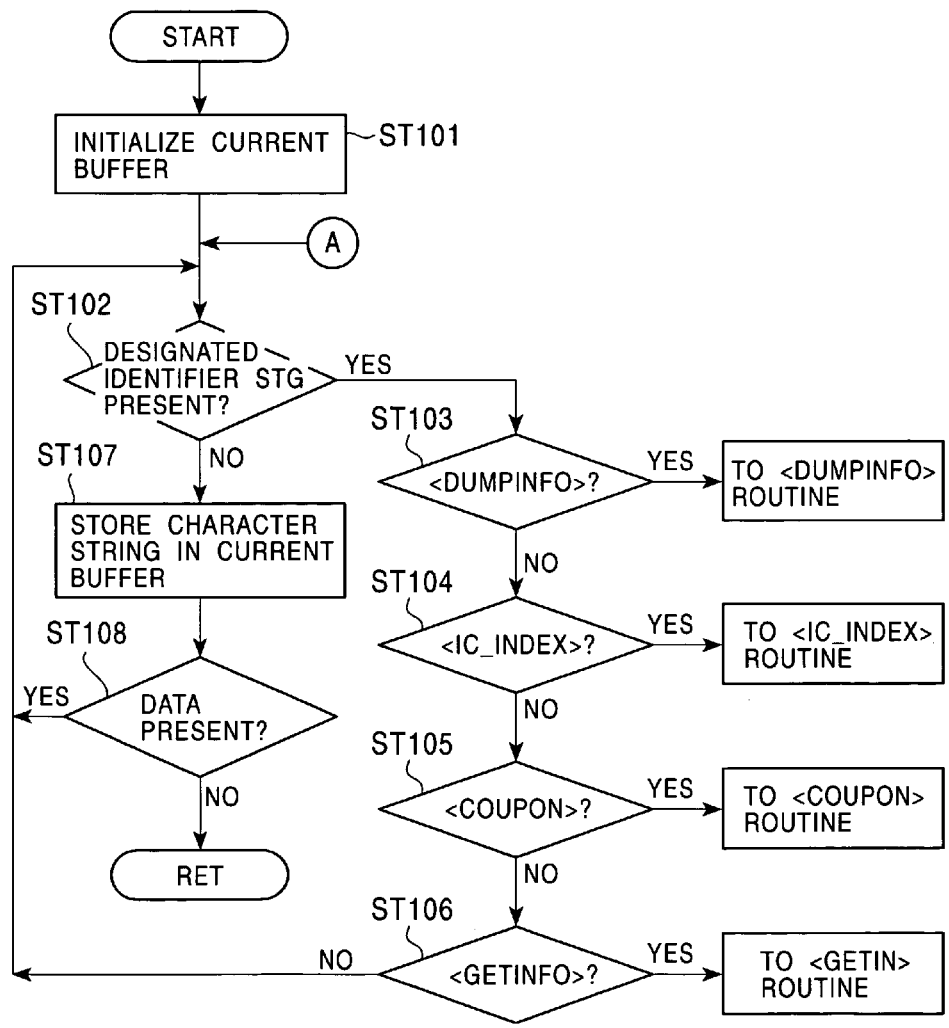
FIG. 18 is a flow diagram showing the processing of a designated identifier in the information processing method of the present invention.

The page data shaping unit 113 recognizes the designated identifier STG of the acquired page data PD, extracts the data from the page data PD, and analyzes the tag in the extracted data according to the tag analysis conditions 408b shown in FIG. 7B. The page data shaping unit 113 thus produces a text file and a bitmap file. Specifically, as shown in FIG. 18, a current buffer to be used for character string processing is initialized in step ST101. In step ST102, a check is made to determine whether the character string forming the page data PD includes a designated identifier STG. When it is determined that the character string forming the page data PD includes a designated identifier STG, steps in ST103, ST104, ST105, and ST106 are respectively performed in accordance with the type of the designated identifier STG. When no designated identifier STG is included, the character string of the page data PD is stored in the current buffer. The character string of the page data PD within the range delimited by the designated identifiers STG is also stored in the current buffer. Steps ST102–ST108 are performed on all character strings of the page data PD.

Figure 19:
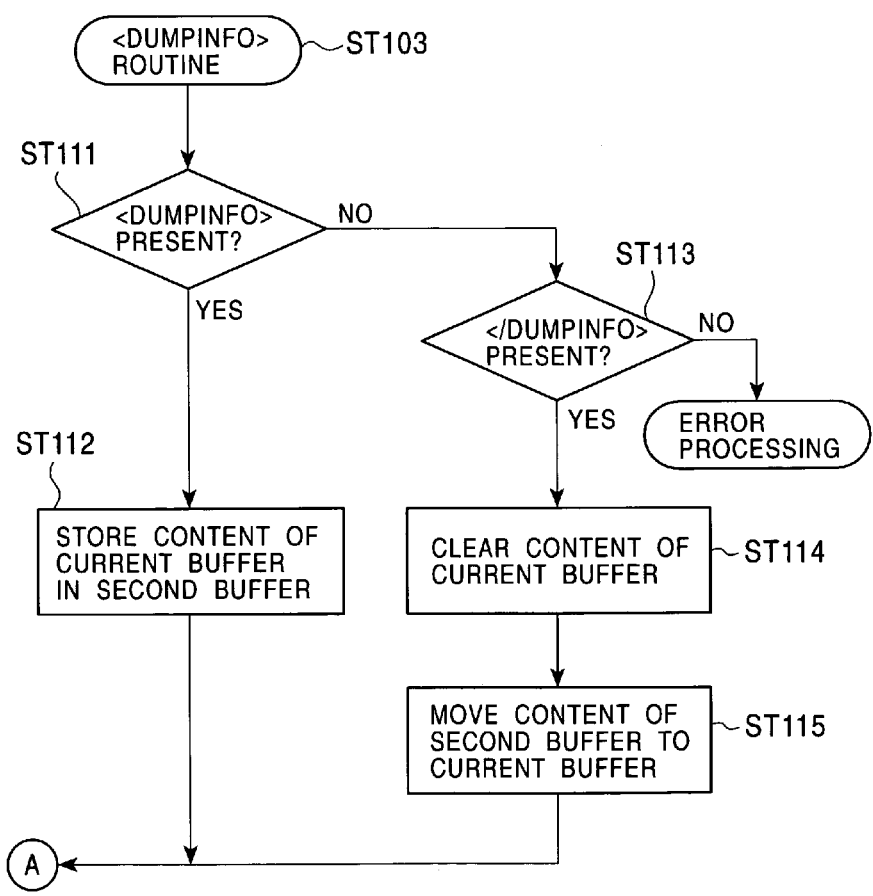
FIG. 19 is a flow diagram showing the processing of a designated identifier in the information processing method of the present invention.

FIG. 19 is a flow diagram showing the processing method of the <DUMPINFO> tag and the </DUMPINFO> tag as the designated identifiers STG. In step ST111 in FIG. 19, it is determined whether a tag recognized by the page data shaping unit 113 is a <DUMPINFO> tag. When it is determined that the <DUMPINFO> tag is recognized, the content of the current buffer is stored in a second buffer for character string processing in step ST112. The data stored in the current buffer is thus protected during the processing of character strings. In steps ST102–ST108 in FIG. 18, the character data following the <DUMPINFO> tag is stored in the current buffer.

If a </DUMPINFO> tag is recognized in the page data PD in step ST113, all data stored in the current buffer is erased in step ST114. The data within the range delimited by the <DUMPINFO> tag and the </DUMPINFO> tag is deleted. In step ST115, the data evacuated in the second buffer is moved to the current buffer.

Figure 20:
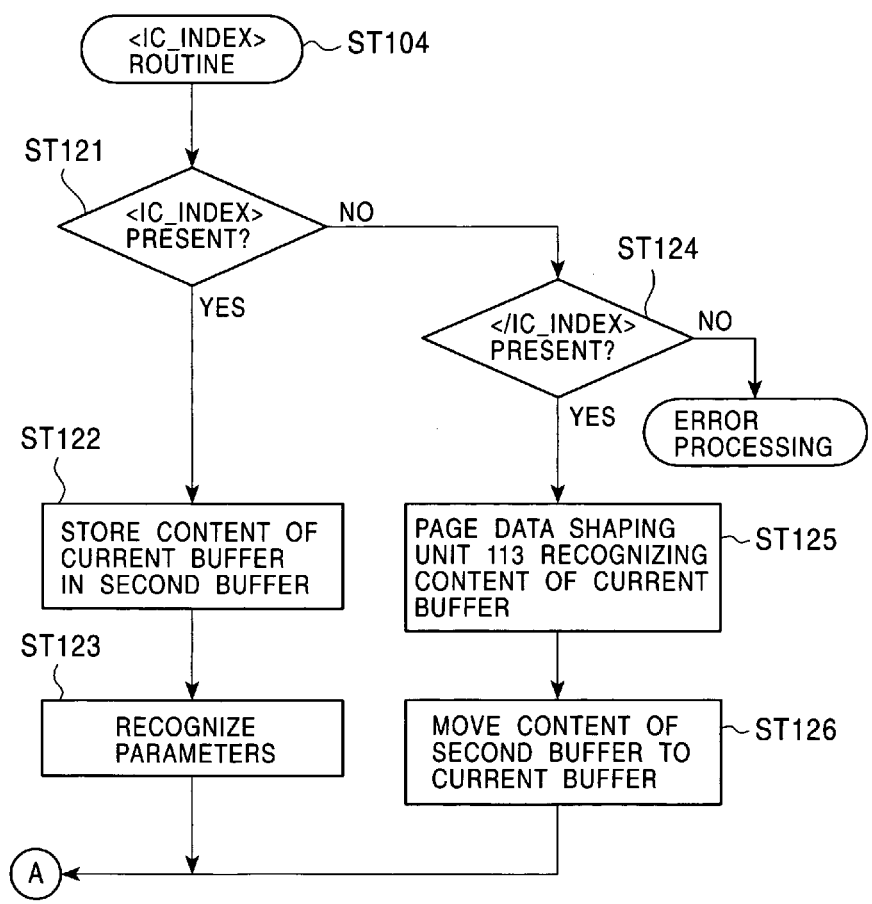
FIG. 20 is a flow diagram showing the processing of a designated identifier in the information processing method of the present invention.

FIG. 20 is a flow diagram showing the processing method of the <IC_INDEX> tag and the </IC_INDEX> tag as the designated identifiers STG. In step ST121 in FIG. 20, it is determined whether a tag recognized by the page data shaping unit 113 is a <IC_INDEX> tag. When it determined that the <IC_INDEX> tag is recognized, the content of the current buffer is stored in a second buffer for character string processing in step ST122. The data stored in the current buffer is thus protected during the processing of character strings. In step S123, a "name" parameter and a "link" parameter designated in the <IC_INDEX> tag are recognized. In steps ST102–ST108 in FIG. 18, the character data following the <IC_INDEX> tag is stored in the current buffer.

If a </IC_INDEX> tag is recognized in the page data PD in step ST124, the page data shaping unit 113 regards the content of the current buffer and the parameter as the data to be shaped, and reads the data stored in the current buffer in step ST125. In step ST126, the data stored in the second buffer is moved to the current buffer.

Figure 21:
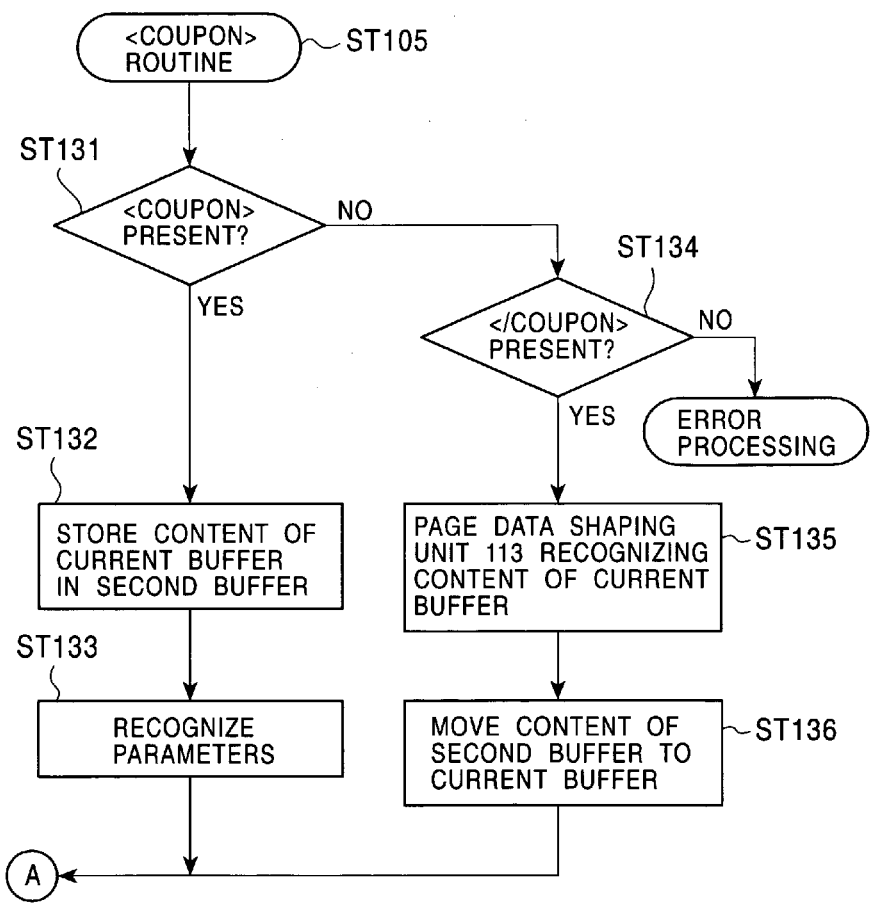
FIG. 21 is a flow diagram showing the processing of a designated identifier in the information processing method of the present invention.

FIG. 21 is a flow diagram showing the processing method of the <COUPON> tag and the </COUPON> tag as the designated identifiers STG. In step ST131 in FIG. 21, it is determined whether a tag recognized by the page data shaping unit 113 is a <COUPON> tag. When it determined that the <COUPON> tag is recognized, the content of the current buffer is stored in a second buffer for character string processing in step ST132. The data stored in the current buffer is thus protected during the processing of character strings. In step S133, a "limit" parameter designated in the <COUPON> tag are recognized. In steps ST102–ST108 in FIG. 18, the character data following the <COUPON> tag is stored in the current buffer.

If a </COUPON> tag is recognized in the page data PD in step ST134, the page data shaping unit 113 regards the content of the current buffer and the parameter as the data to be shaped, and reads the data stored in the current buffer in step ST135. In step ST136, the current buffer restores the data thereof, with the data stored in the second buffer moved thereto.

Figure 22:
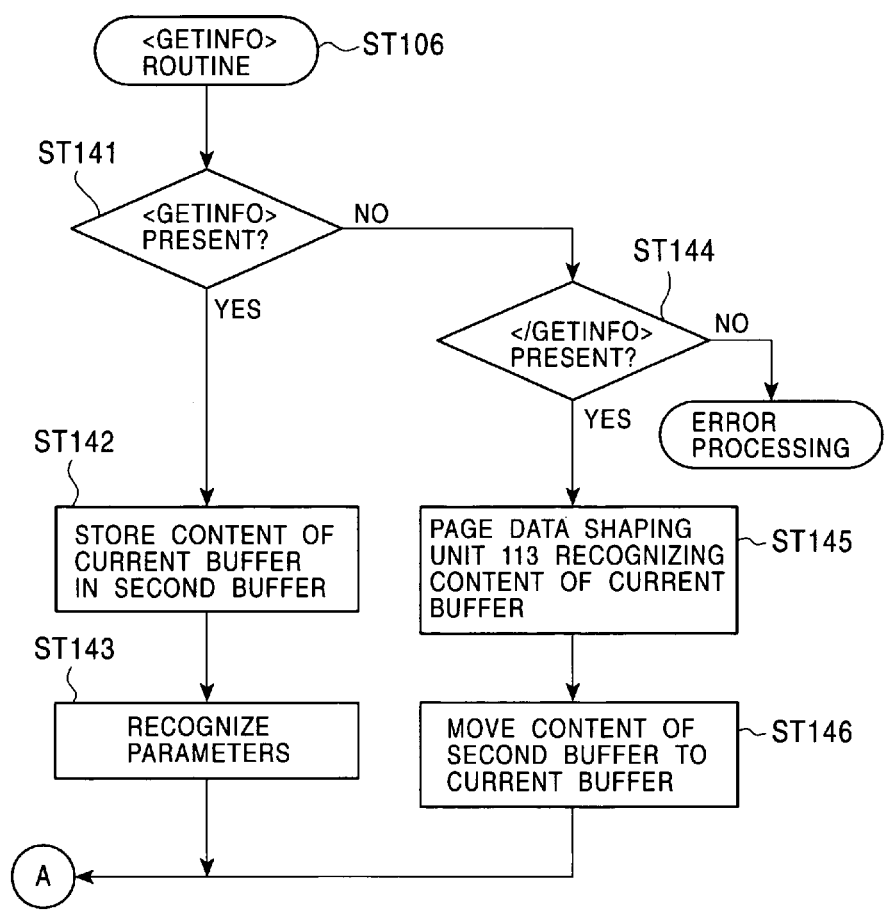
FIG. 22 is a flow diagram showing the processing of a designated identifier in the information processing method of the present invention.

FIG. 22 is a flow diagram showing the processing method of the <GETINFO> tag and the </GETINFO> tag as the designated identifiers STG. In step ST141 in FIG. 22, it is determined whether a tag recognized by the page data shaping unit 113 is a <GETINFO> tag. When it determined that the <GETINFO> tag is recognized, the content of the current buffer is stored in a second buffer for character string processing in step ST142 for evacuation. The data stored in the current buffer is thus protected during the processing of character strings. In step S143, a "name" parameter and a "link" parameter designated in the <GETINFO> tag are recognized. In steps ST102–ST108 in FIG. 18, the character data following the <GETINFO> tag is newly stored in the current buffer.

If a </GETINFO> tag is recognized in the page data PD in step ST144, the page data shaping unit 113 regards the content of the current buffer and the parameter as the data to be shaped, and retrieves the data stored in the current buffer in step ST145. In step ST146, the current buffer restores the data thereof, with the data stored in the second buffer moved thereto.

Figure 23:
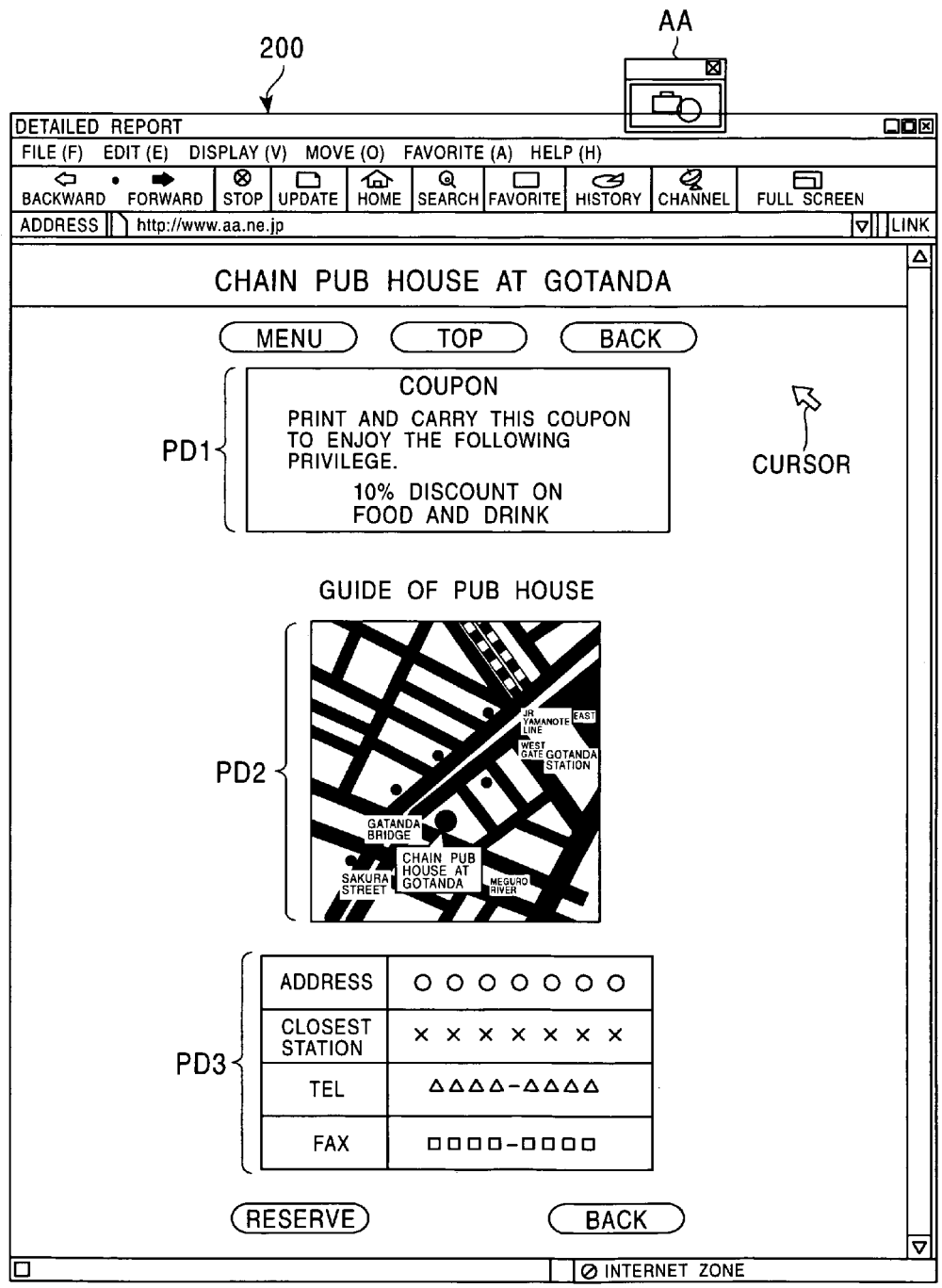
FIG. 23 shows a screen window in the information processing method of the present invention.

In this way, the page data shaping unit 113 recognizes the designated identifiers STG and extracts, from the page data PD, the data to be shaped. The page data shaping unit 113 shapes the page data PD to be displayable on the mobile terminal 30 based on the processing condition data PCD. Specifically, the processing condition data PCD shown in FIG. 23 is now acquired and shaped. For example, first page data PD1 of the page data PD is associated with the <COUPON> tag and the </COUPON> tag, and second page data PD3 is associated with the <IC_INDEX> tag and the </IC_INDEX> tag. The page data shaping unit 113 extracts the first acquired page data PD1 and the second acquired page data PD3.

The page data shaping unit 113 analyzes the first acquired page data PD1 and the second acquired page data PD3 according to the tag analysis conditions 408b. The page data shaping unit 113 converts the first acquired page data PD1 and the second acquired page data PD3 into text files TEXT 1 and TEXT2 according to the tag analysis conditions 408b. Further, the page data shaping unit 113 performs a character count per line process and a line boundary character process on the text files TEXT1 and TEXT2 according to the format conditions 408a.

On the other hand, the page data shaping unit 113 extracts acquired image data PD2 as an image file within the page data PD to be converted, according to the file condition in the shaping conditions 408a. The page data shaping unit 113 converts the data format of the acquired image data PD2 compatible with GIF, JPEG, or the like into a bitmap file BMP1. The page data shaping unit 113 adjusts the converted bitmap file BMP1 in file size, file height, width according to the imaging conditions 408c.

Figure 24:
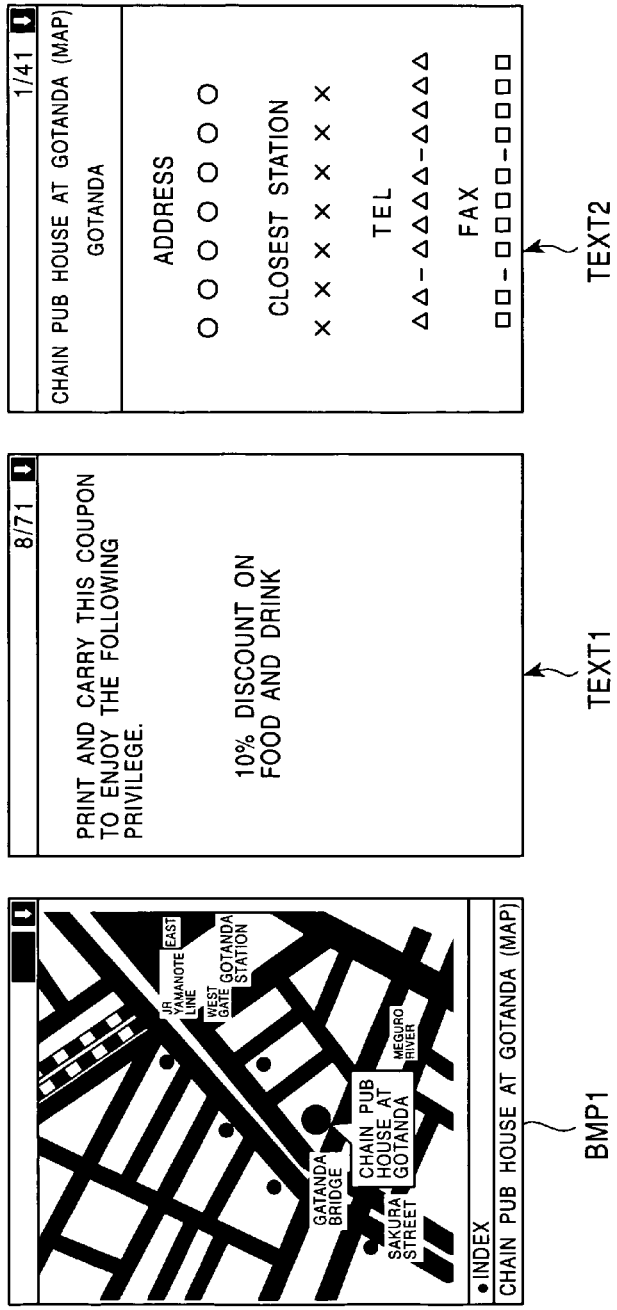
FIG. 24A shows one example of a bitmap file generated in the information processing method of the present invention.
FIG. 24B shows one example of a first text file generated in the information processing method of the present invention.
FIG. 24C shows one example of a second text file generated in the information processing method of the present invention.

Referring to FIGS. 24A, 24B, and 24C, the mobile terminal 30 presents the text files TEXT1 (FIG. 24B), and TEXT2 (FIG. 24C), and the image file BMP1 (FIG. 24A) in their proper state. Since the page data shaping unit 113 shapes the data according to the shaping conditions 408, the user performs the acquisition and shaping process by simply clicking the acquired icon AA. The acquisition and shaping process is thus efficiently performed.

Figure 25:
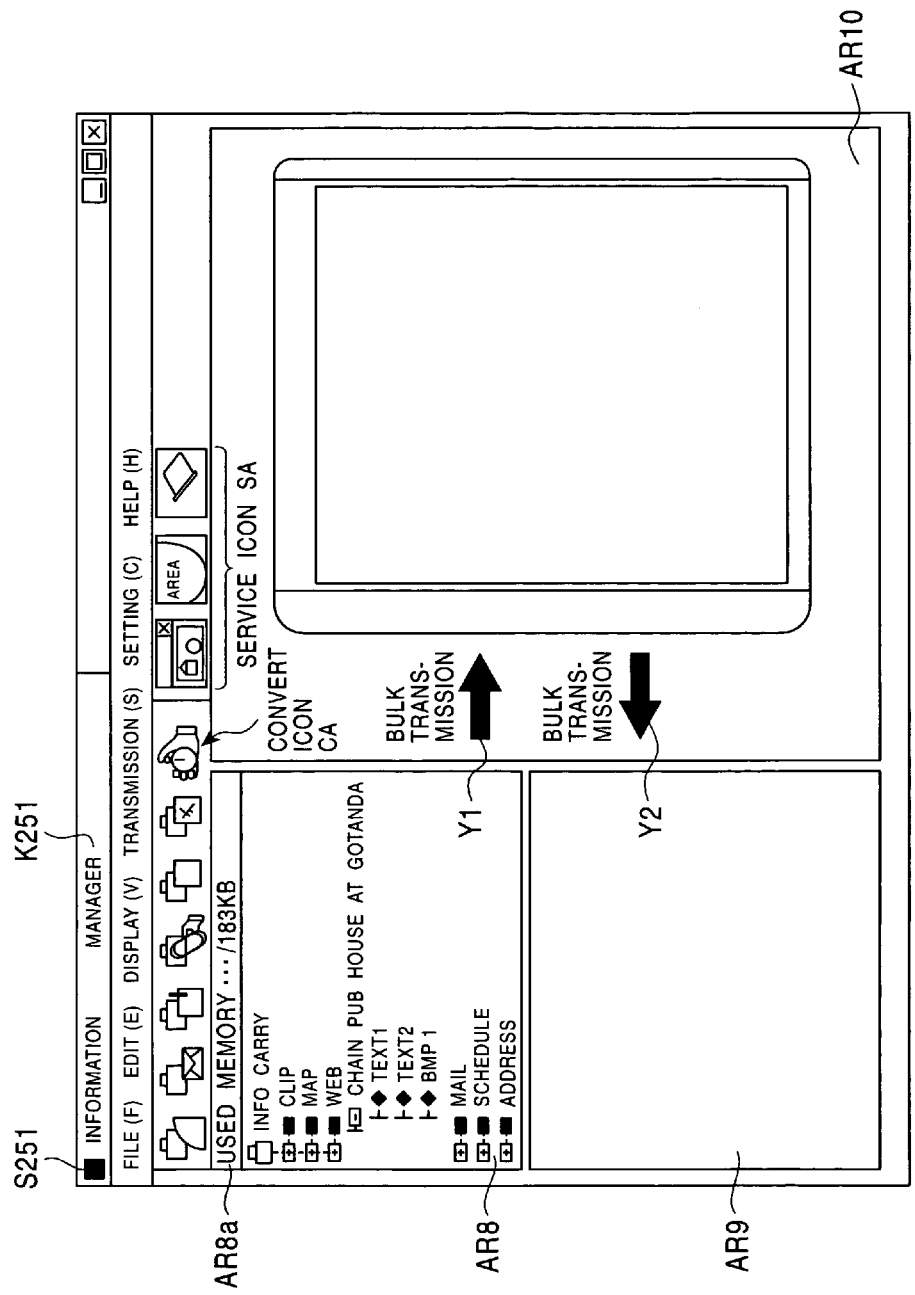
FIG. 25 shows a screen window in the information processing method of the present invention.

In step ST15 shown in FIG. 17, the page data shaping unit 113 stores the created transmission data TD in the transmission data area 103. In this case, the page data shaping unit 113 holds the transmission data TD in directories (folders) created in the transmission data area 103. Referring to FIG. 25, the transmission data window AR 8 displays the text file and the bitmap file, created by the page data shaping unit 113, in their state held in the directories. The user selects a file in the transmission data window AR 8, or transmits the transmission data TD to the mobile terminal 30 in a bulk.

In each of the above embodiments, the page data shaping unit 113 extracts the necessary data from the page data PD in accordance with the designated identifier attached to the page data PD, and shapes the extracted data according the processing condition data PCD. The shaping operation of the data is efficiently and quickly performed. With the designated identifier attached, the data within the page data has a particular meaning. Specifically, by attaching the coupon identifier indicating the coupon information, for example, the coupon service may be provided over the Internet.

The present invention is not limited to the above embodiments. In the above discussion, the page data PD is located on the network. The present invention is applicable to a HTML document in the form of a manual distributed on a CD-ROM or a floppy disk. In this case, the address AS presented on the file monitor 200 is the location of the corresponding file in the auxiliary storage device 23. The page data PD may be stored in the hard disk when the information processing apparatus 20 is shipped. In this case, the address AS presented in the file monitor 200 is the location of the corresponding file in the auxiliary storage device 23. The page data acquisition unit 112 shown in FIG. 6 may have an acquisition area for separately storing another page data PD. The page data acquisition unit 112 may directly access the page data PD on the network in accordance with the address AS and store the page data PD on the acquisition area.

In the above discussion, the mobile terminal 30 handles the text data and the bitmap data as the data format of the transmission data TD. Another data format is acceptable as long as the mobile terminal 30 can handle.

In accordance with the present invention, the page data is processed to be displayable on the mobile terminal according to the designated identifier and processing information data. The present invention thus provides the information processing apparatus, and the information processing method having good user interface capability, and a program storage medium for storing the information processing program.

What is claimed is:

1. A computer-implemented file conversion method for extracting, from an HTML file acquired through the internet and composed of a plurality of pieces of data displayable on a display unit and with a start and an end of each piece of data indicated by respective identifiers in the form of tags, data displayable on a limited-capability device, in accordance with the identifiers, and for outputting the extracted data to the limited-capability device, the file conversion method comprising:
    a step of determining what characteristic of the HTML file is to be converted;
    a step of detecting the tags by reading the file;
    a step of determining whether the data indicated by the detected tags is displayable on the limited-capability device;
    a step of extracting the data, the start and the end of which are indicated by the detected tags and which is determined to be displayable on the limited-capability device;
    a step of displaying on the display unit the extracted data to be shaped for display on the limited-capability device;
    a step of reading out a stored conversion rule that is specific to each set of tags and that has having shaping conditions including character count per line and image size limitations;
    a step of converting, based on the read-out conversion rule, the extracted data to meet the limitations for display on the limited-capability device; and
    a step of outputting an output file that is newly created from the extracted data that has been shaped in the step of shaping, as a different file from the HTML file, to the limited-capability device for display,
    wherein the step of extracting the data is performed by referencing a processing condition data area of a memory file that defines the tags of the HTML data that is displayable on the limited-capability device, and
    wherein the processing condition data area has a data structure containing a plurality of categories, and wherein the file conversion method further comprises selecting the processing condition data to be used, based on the category selected from among the plurality of categories.

2. A file conversion method according to claim 1, wherein a file name of a file output as the different file uses a symbol string indicated by the predetermined identifier.

3. A file conversion method according to claim 1, further comprising a step of selecting a file to be output to the limited-capability device from among the extracted data in response to an instruction from a user.

4. A file conversion method according to claim 1, further comprising a step of acquiring the first file through a communication network from a data storage apparatus.

5. A file conversion method according to claim 1, wherein the step of extracting the data comprises initializing a data buffer, and buffering in the data buffer the data included in the
    first file, the start and the end of which are indicated by the detected identifiers.

6. A file conversion method according to claim 1, wherein the outputting of the data, the start and the end of which are indicated by the identifiers, to the limited-capability device is restricted in accordance with the identifiers.

7. A file conversion method according to claim 1, wherein the expiration date of the data, the start and the end of which are indicated by the identifiers, is indicated by the identifiers.

8. A converter for extracting, from an HTML file acquired through the internet and composed of a plurality of pieces of data displayable on a display unit and with a start and an end of each piece of data indicated by respective identifiers in the form of tags, data displayable on a connected limited-capability device, and for outputting the extracted data to the limited-capability device, the file converter comprising:
  means for selecting a characteristic of the HTML file that is to be converted;
  file storage means for storing the HTML file;
detector means for detecting the tags corresponding to the selected characteristic that indicates an area of the data
  to be displayed on the limited-capability device from the HTML file stored in said HTML file storage means;
  extractor means for extracting, from said HTML file, the data with the start and the end thereof indicated in accordance with the identifier detected by the detector means, wherein the extracted data is one of a map, a coupon, and address information,
  wherein the data is extracted by referencing a processing condition data area of a memory file that defines the tags of the HTML data that is displayable on the limited-capability device, and
  wherein the processing condition data area has a data structure containing a plurality of categories, and the processing condition data to be used is selected based on the category selected from among the plurality of categories;
  convertor means for converting date of the HTML file that is between the tags according to a stored predetermined conversion rule for the tags;
  output means for outputting the extracted data to the limited-capability device, whereby the limited-capability device displays on a screen thereof one of the map, the coupon, and the address information; and
  control means for controlling the detector means to detect the tags indicating the start and the end of the displayable data for the purpose of converting the data displayable on the limited-capability device from said HTML file stored in said file storage means based on the stored predetermined conversion rule having shaping conditions, for controlling said extractor means to extract, as a new output file with the selected characteristic having been converted, data including the start and the end indicated by the tags from said HTML file, and for controlling said output means to output the new output file to the limited-capability device for display.

9. A data converter according to claim 8, further comprising an extracted data storage means for storing the extracted data as candidate data to be output to the limited-capability device.

10. A data converter according to claim 9, wherein the data converter selectively outputs the data from among data stored in said extracted data storage means to the limited-capability device in response to an instruction of a user.

11. A data converter according to claim 8, further comprising a display data output means for converting said HTML file into a data format displayable on the limited-capability device for displaying said HTML file,
  wherein the data converter acquires a file which is converted to be output to the limited-capability device from a file buffer means which buffers at least one file of the display data output means.

12. A data converter according to claim 8, further comprising a data communication means for acquiring the file through a communication network.

13. A data converter according to claim 8, wherein the data converter restricts, to the limited-capability device, the outputting of data not displayable on the limited-capability device, from among data from the start to the end indicated by the extracted identifier.

14. A data converter according to claim 8, further comprising:
  an expiration date extractor means for extracting, from the identifier, expiration date data indicating the expiration date of the data extracted by the identifier; and
  an expiration date determination means for determining the expiration date of the extracted data based on the expiration date of the extracted data.

15. A data converter according to claim 8, further comprising a data renewal means for renewing the expiration date of the extracted data when it is determined that the extracted data has expired.

16. A file display system comprising a first apparatus for receiving an HTML file including a plurality of pieces of data, displayable on a display unit, with the start and the end of each piece of data indicated by respective identifiers in the form of tags, and a second apparatus having a throughput lower than that of the first apparatus and receiving and displaying data into which the first apparatus converts the HTML file, wherein the first apparatus comprises:
  means for selecting a characteristic of the HTML file that is to be converted;
  storage means for storing the HTML file;
  detector means for detecting the tags that indicate an area of the data that is to be processed by the second apparatus, from the HTML file stored in the storage means;
  extractor means for extracting, from the input file, the data which is detected by the detector means and is processed into data processable by the second apparatus, wherein the extracted data is one of a map, a coupon, and address information,
  wherein the data is extracted by referencing a processing condition data area of a memory file that defines the tans of the HTML data that is displayable on the limited-capability device, and
  wherein the processing condition data area has a data structure containing a plurality of categories, and the processing condition data to be used is selected based on the category selected from among the plurality of categories;
  convertor means for converting the extracted data of the HTML file that is between the tags according to a stored predetermined conversion rule for the tags into the data that is processable by the second apparatus;
  an output means for outputting the data, which has been converted to be processable by the second apparatus, to the second apparatus; and
  control means for controlling the storage means to store the HTML file input thereto in the storage means, for controlling the detector means to detect the tags that indicate, from the HTML file stored in the storage means, data that can be processed by the second apparatus, for controlling the extractor means to extract the data that is converted by the convertor means in accordance with the identifier detected by the detector means, and for controlling the output means to output the data that has been processed by the processing means based on the selected characteristic; and
  wherein the second apparatus comprises:
  receiver means for receiving the data output by the first apparatus; and
  display means for displaying on a limited-capability display the data received by the receiver means in the form of one of the map, the coupon, and the address information.

17. A file display system according to claim 16, wherein the first apparatus further comprises a receiver means, and wherein the receiver means receives the file from a file server connected to the receiver means via a network.

18. A file display system according to claim 16, wherein the first apparatus further comprises a buffer means for buffering the data extracted from the file by the control means, and wherein the control means controls the buffer means to buffer the extracted data while processing the data buffered in the buffer means.

19. A file display system according to claim 16, wherein the first apparatus further comprises an operation means operated by a user, and wherein the control means outputs the data, designated on the operation means by the user, to the second apparatus.

20. A file display system according to claim 16, wherein the second apparatus further comprises:

an operation means operated by a user; and a storage means for storing the data received by the receiver means, wherein the data designated on the operation means by the user is read from the storage means and is displayed on the display means.

21. A file conversion method according to claim 1, wherein the step of determining what characteristic determines one of an image size and a file format and a character count.

22. A data converter according to claim 8, wherein the characteristic is selected from one of an image size and a file format and a character count.

23. A file conversion method according to claim 1, wherein the step of determining what characteristic determines one of an image size, a file format, and a character count.

24. A file display system according to claim 16, wherein the characteristic is selected from one of an image size, a file format, and a character count.

* * * * *